United States Patent [19]
Fujikawa et al.

[11] Patent Number: 5,165,485
[45] Date of Patent: Nov. 24, 1992

[54] EDGER WITH IMPROVED BLADE COVER ASSEMBLY

[75] Inventors: Tetsuzo Fujikawa, Kobe; Makizo Hirata, Kakogawa; Shigeharu Ohama; Michio Nishimura, both of Kobe, all of Japan

[73] Assignee: Kawasaki Jukogyo Kabushiki Kaisha, Kobe, Japan

[21] Appl. No.: 766,321

[22] Filed: Sep. 27, 1991

Related U.S. Application Data

[62] Division of Ser. No. 522,923, May 14, 1990.

[30] Foreign Application Priority Data

| May 15, 1989 | [JP] | Japan | 1-55970[U] |
| May 18, 1989 | [JP] | Japan | 1-58022[U] |
| May 22, 1989 | [JP] | Japan | 1-128554[U] |
| Jun. 28, 1989 | [JP] | Japan | 1-75824[U] |
| Jun. 28, 1989 | [JP] | Japan | 1-75825[U] |
| Jun. 28, 1989 | [JP] | Japan | 1-75826[U] |
| Jul. 4, 1989 | [JP] | Japan | 1-79244[U] |

[51] Int. Cl.$^5$ .................................. A01D 34/84
[52] U.S. Cl. ........................... 172/15; 172/13; 172/508; 56/17.4; 56/320.1
[58] Field of Search .................. 172/13–17, 172/41, 42, 43, 112, 508, 509, 517; 56/17.4, 320.1, DIG. 24, 16.7, 17.5, 256, DIG. 20; 403/335, 336, 337, 388

[56] References Cited

U.S. PATENT DOCUMENTS

| 2,718,742 | 9/1955 | Tangeman | 172/15 X |
| 2,827,748 | 3/1958 | Simpson | 172/14 X |
| 3,006,421 | 10/1961 | Feilbach | 56/17.4 X |
| 3,734,196 | 5/1973 | Mangum | 56/17.1 X |
| 3,743,028 | 7/1973 | McCloud | 172/15 |
| 4,364,435 | 12/1982 | Tuggle et al. | 172/15 |
| 4,736,573 | 4/1988 | Seck | 56/17.4 |
| 5,065,567 | 11/1991 | Wessel et al. | 172/13 X |

FOREIGN PATENT DOCUMENTS

| 62-99937 | 6/1987 | Japan . |
| 62-164729 | 10/1987 | Japan . |
| 62-236406 | 10/1987 | Japan . |
| 63-28322 | 2/1988 | Japan . |

OTHER PUBLICATIONS

"Saftor" Sales brochure, S. G. Cutter PTE Ltd, Singapore, Oct. 1987.

Primary Examiner—Randolph A. Reese
Assistant Examiner—Jeffrey L. Thompson
Attorney, Agent, or Firm—Leydig, Voit & Mayer

[57] ABSTRACT

An edger having a main frame, at least one front wheel fastened in the front portion of the main frame, two rear wheels fastened in the rear portion of the main frame, a rotary blade disposed in the front portion of either side of the main frame and capable of conducting edging, an engine mounted on the main frame and a driving device for operating the rotary blade with the engine, the edger comprising: a resin cover fastened to a circular flange on the rotary-blade supporting shaft for covering a portion of the rotary blade. A structure for fitting the rotary blade cover includes a thin metal plate having an outer diameter larger than the flange, and fastening members for clamping the inner portion of the cover between the flange and the thin metal plate. Bolt assemblies are provided for fastening the thin metal plate and the cover together at a position outside the flange.

4 Claims, 24 Drawing Sheets

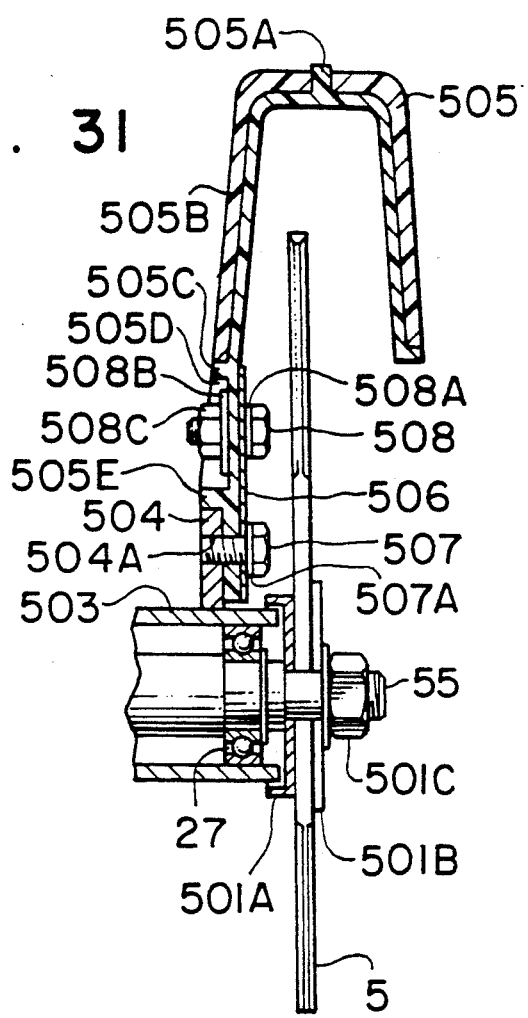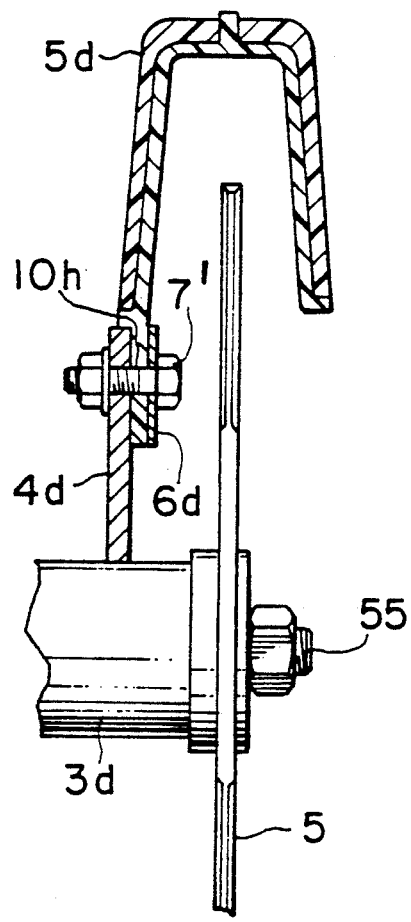

EDGER WITH IMPROVED BLADE COVER ASSEMBLY

This application is a divisional of application Ser. No. 07/522,923, filed May 14, 1990.

BACKGROUND OF THE INVENTION

1. Field of the Invention

The present invention relates to an edger, and, more particularly, to an edger used for trimming the edge of a lawn and a grass along the road or curbstones.

2. Prior Art

A conventional edger has been arranged to have a rotary blade operated by an engine and disposed in the front portion on either side of the edger body and runs with its front and the rear wheels grounded. The edging operation is performed not only in a flat area but also, for example, along curbstones disposed to some extent higher than the level ground. Since the width of the curbstone structure is usually smaller than that of the edger, the wheel disposed on the opposite side to the rotary blade projects over the curbstones and floats. In this case, an operator must conduct the edging operation with a portion of the edger projecting over the supporting curbstones, causing hard labor. What is worse, the result of the edging operation usually becomes unsatisfactory.

Accordingly, the conventional structure has been arranged in such a manner that an attachment to which a wheel is fastened to a junction of a V-shaped frame thereof is, via a sub-frame and a bolt, fastened to the rear wheel positioned opposite to the rotary blade of the edger body. Thus, the wheel fastened to the attachment is grounded on a flat area B (as indicated in FIG. 7) below the curbstones so that the side portion of the edger projecting over the curbstones is supported. Thus, the edger can be properly leveled at the time of the edging operation.

Another edger (an example of which is illustrated in FIG. 8) has been known which is arranged in such a manner that a rear wheel disposed opposite to the rotary blade of the edger body is, via a supporting plate, disposed at the lower end portion of a vertical position adjusting plate in the form of a sector. Furthermore, the central portion of the sector vertical position adjusting plate is rotatably borne on the edger body. In addition, a plurality of through-holes are formed in the circumferential direction of the position adjusting plate at certain intervals and a supporting member having a threaded hole formed therein is arranged to project over the edger body. A bolt inserted into one of the above-described through-holes is inserted into the threaded hole so that the above-described position adjusting plate is fixed. The vertical position of the rear wheel with respect to the edger body can be adjusted by changing the through-hole formed in the position adjusting plate into which the above-described bolt is inserted. An example of the above-described conventional technology has been disclosed in Japanese Utility Model Laid-Open No. 62-99937.

According to the above-described two conventional edgers, a user must temporarily release the handle of the edger so as to fasten the attachment with a bolt or change the through hole formed in the position adjusting plate into which the bolt is inserted. Therefore, the operation takes excessively long. Furthermore, the adjustment of the vertical position of the above-described wheel (the rear wheel) with respect to the edger body must be conducted with the edger body supported from the side direction (the opposite side to the rotary blade). Therefore, it is difficult to complete the adjustment work. In particular, the former edger raises the necessity to reserve the attachment when it is not used, causing difficulties.

SUMMARY OF THE INVENTION

Accordingly, an object of the present invention is to provide a low cost and simple edger arranged such that the vertical position (the height) of the rear wheel can be easily adjusted by a user at a position at which the user holds the handle.

In order to achieve the above-described object, the edger according to the present invention is arranged in such a manner that the rear wheel positioned opposite to the rotary blade is fastened with a supporting arm such that its vertical position with respect to the main frame can be adjusted. A positioning mechanism for positioning the rear wheel by the lever operation by the hand or the foot operation is disposed between the supporting arm and the main frame.

Other and further objects, features and advantages of the invention will be appear more fully from the following description.

BRIEF DESCRIPTION OF THE DRAWINGS

FIG. 31 is a cross sectional view taken along 31—31 of FIG. 30;

FIG. 33 is a cross sectional view taken along line 33—33 of FIG. 32;

FIG. 34 is a side elevational view which illustrates an essential portion of a state in which an improved clutch and brake device of a belt driving device of the edger according to the present invention is thrown in;

FIG. 37 is a side elevational view which illustrates a state in which the clutch of a conventional belt driving device is thrown in;

FIG. 39 is a side elevational view which illustrates the clutch of the belt driving device according to another embodiment of the present invention is thrown in;

BRIEF DESCRIPTION OF THE PREFERRED EMBODIMENTS

The present invention will now be described in comparison to the conventional structure with reference to the drawings.

Rear wheel which can be vertically adjustable

Figure 7:
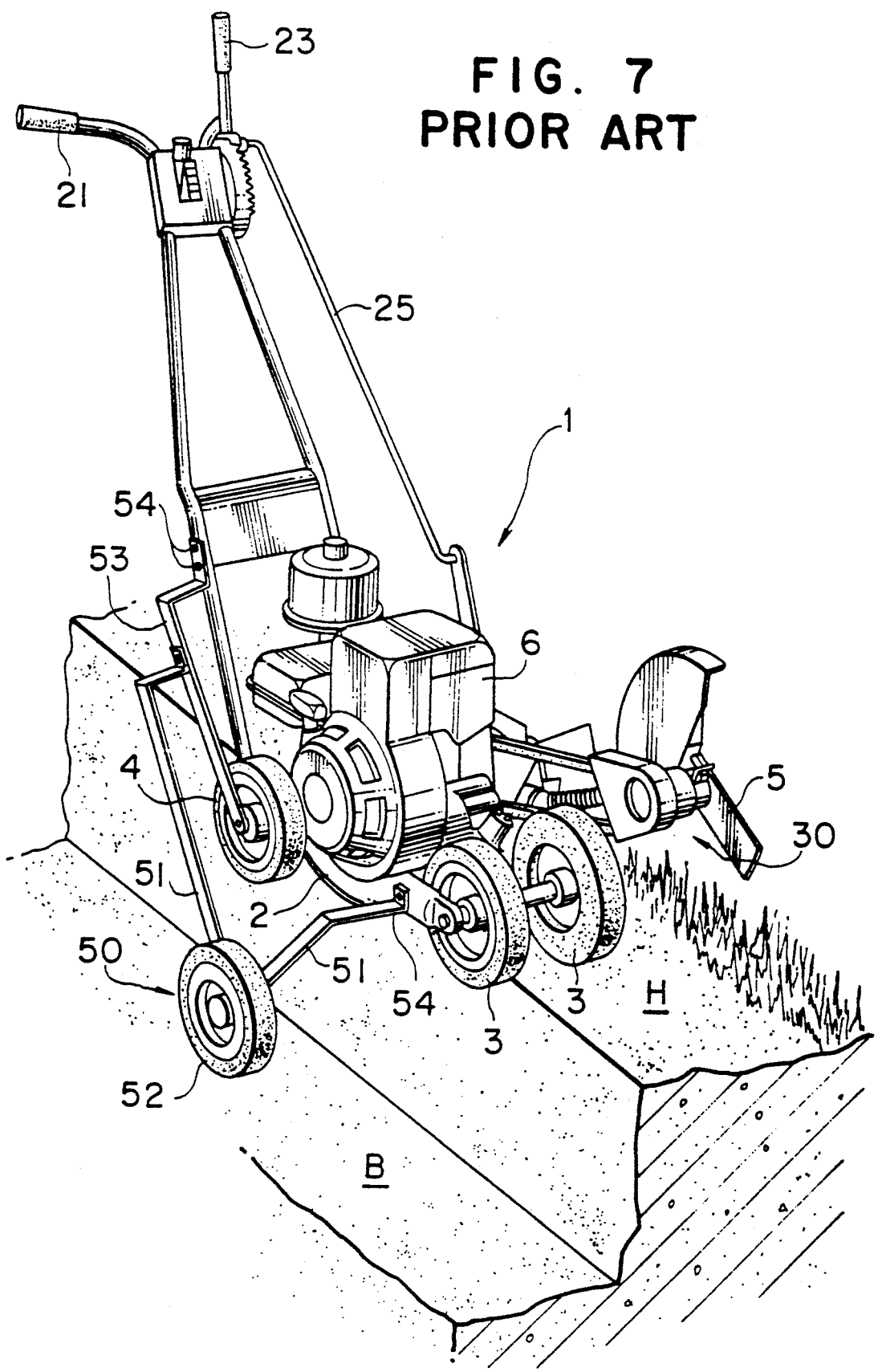
FIG. 7 is a perspective view of a conventional edger.

As shown in FIG. 7, a conventional edger 1 is arranged to have a rotary blade 5 operated by an engine 6 and disposed in the front portion on either side of a main frame and runs with its front wheels 3 and the rear wheels 4 grounded. Usually, the attitude of the rotary blade 5 can be optionally changed from the vertical direction to the horizontal direction so that edging operation is conducted by making the rotary blade 5 vertical and the trimming of the top surface of a lawn is conducted by making the rotary blade 5 horizontal.

The edging operation is performed not only in a flat area but also, for example, along curbstones disposed higher than the level ground to some extent. Since the width of the curbstone structure is, as shown in FIG. 7, usually smaller than that of the edger 1, the wheels 3 and 4 disposed on the opposite side to the rotary blade 5 project over the curbstones and float. In this case, an operator must conduct the edging operation with a portion of the edger 1 projecting over the supporting curbstones, causing hard labor. What is worse, the result of the edging operation usually becomes unsatisfactory.

Accordingly, the conventional structure has been arranged as shown in FIG. 7 in such a manner that an attachment 50 to which a wheel 52 is fastened to a junction of its frame 51 in the form of a substantial V-shape is, via a sub-frame 53 and a bolt 54, fastened adjacently to the rear wheel 4 positioned opposite to the rotary blade 5 of the main frame 2. Thus, the wheel 52 fastened to the attachment 50 is grounded on a flat area B below the curbstones H so that the side portion of the edger 1 projecting over the curbstones H is supported. Thus, the edger 1 can be run leveled at the time of the edging operation.

Figure 8:
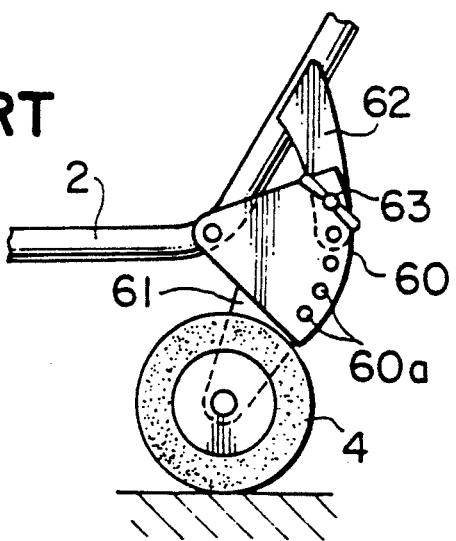
FIG. 8 is a side elevational view which illustrates an essential portion of another conventional edger.

As shown in FIG. 8, another edger is known which is arranged in such a manner that a rear wheel 4 disposed opposite to the rotary blade 5 of the main frame 2 is, via a supporting plate 61, disposed at the lower end portion of a vertical position-adjusting plate 60 in the form of a sector. Furthermore, the central portion of the sector vertical position adjusting plate 60 is rotatably borne in the main frame 2. In addition, a plurality of through-holes 60a are formed in the circumferential direction of the position adjusting plate 60 at certain intervals and a supporting member 62 having a threaded hole (omitted from illustration) formed therein is arranged to project over the main frame 2. A bolt 63 inserted into one of the above-described through holes 60a is inserted into the threaded hole so that the above-described position-adjusting plate 60 is fixed. The vertical position of the rear wheel 4 with respect to the main frame 2 can be adjusted by changing the through hole 60a formed in the position adjusting plate 60 into which the above-described bolt 63 is inserted. An example of the above-described conventional technology has been disclosed in Japanese Patent Laid-Open No. 62-99937.

According to the above-described two conventional edgers, a user must temporarily release the handle of the edger so as to fasten the attachment 50 (see FIG. 7) with a bolt or change the through hole formed in the position adjusting plate 60 (see FIG. 8) into which the bolt is inserted. Therefore, the operation takes an excessively long time. Furthermore, the adjustment of the vertical position of the above-described wheel (the rear wheel) with respect to the main frame must be conducted with the main frame supported from the side direction (the opposite side to the rotary blade). Therefore, it is difficult to complete the adjustment work. In particular, the former edger raises a necessity to reserve the attachment (see FIG. 7) when it is not used, causing difficulties.

A preferred embodiment of the present invention will now be described with reference to FIGS. 1 and 2.

Figure 1:
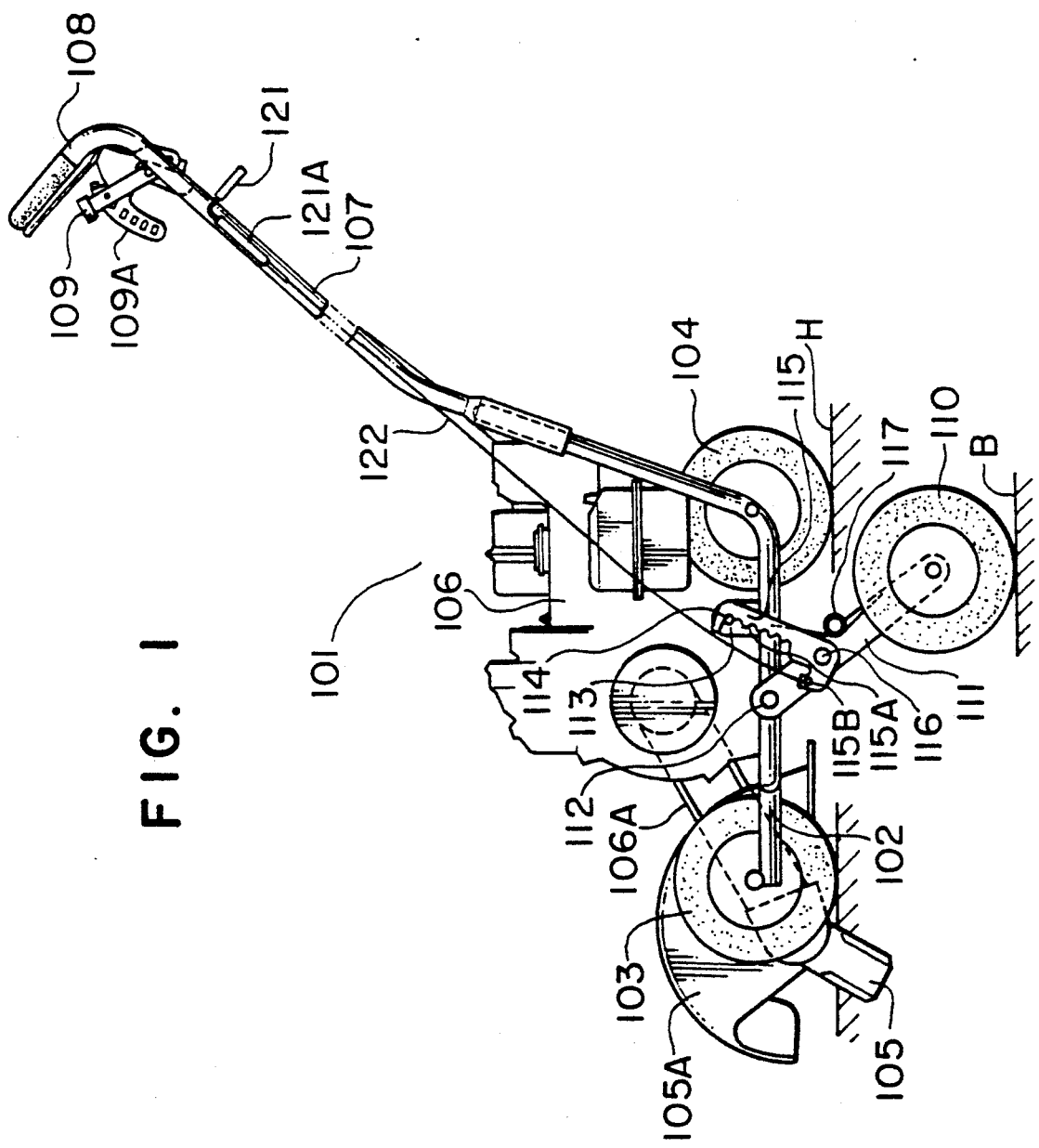
FIG. 1 is a side elevational view which illustrates an edger according to the present invention.

As shown in FIG. 1, an edger 101 has front wheels 103 on both sides of the front portion of a main frame 102 and rear wheels 104 and 110 on both sides of the rear portion of the main frame 102. A rotary blade 105 is disposed in the front portion on the right side of the main frame 102 in such a manner that its substantially half portion is covered by a cover 105A. The rotary blade 105 is operated by an engine 106, mounted on the main frame 102, via a belt 106A and arranged in such a manner that its direction (its attitude) is changed between the illustrated edging position (in the vertical direction) and the top-surface trimming position (in the horizontal direction). Also the height of the rotary blade 105 is capable of being adjusted.

The edger 101 has a pair of handle frames 107 arranged diagonally upwards projecting over the right and the left rear end portions of the main frame 102 The top end portions of the handle frames 107 are bent and connected to each other so as to be in the form a handle 108 designed to be conveniently pushed by the hands. A control rod 109 for adjusting the direction and the height of the rotary blade 105 is fastened to the handle frame 107 in its portion close to the handle 108 via a bracket 109A.

The left wheel of the rear wheels 104 and 110, that is, the rear wheel 110 disposed on the side opposite to the rotary blade 105 is arranged in such a manner that its vertical position can be adjusted. Namely, the rear wheel 110 is pivoted at the front end portion of a supporting arm 111 serving as a supporting member, the supporting arm 111 being rotatably fastened, by a bolt-/nut 112, at the base portion thereof to the substantially center position of the left side of the main frame 102. A supporting member 113 is secured to the main frame 102 at a position slightly behind the position at which the supporting arm 111 is fastened, the supporting member 113 having a top end portion into which a securing pin 114, serving as a securing member, is inserted. The base portion of a sawtoothed securing arm 115 having a multiplicity of securing notches or sawteeth on one side thereof is, by a bolt/nut 116, rotatably fastened to the substantially intermediate position of the supporting arm 111 with the securing serrations or sawteeth 115A allowed to face forward. A compression spring 117, in a biased state, disposed between the intermediate portion of the securing arm 115 and the supporting arm 111 so that the front end portion of the securing arm 115 is urged in the direction in which a the securing sawtooth 115A is secured by the securing pin 114.

According to this embodiment, a mechanism for selecting the position of the rear wheel 110 is constituted by the securing pin 114 and the securing arm 115.

A control lever 121 is, by means of a supporting sleeve 121A, movably arranged along the handle frame 107 at a position adjacent to the above-described handle 108. The lower end portion of the control lever 121 and a cable-fastening portion 115B (see FIG. 2) of the securing arm 115 at its front end portion of the base portion are connected to each other by a control cable 122 (or a rod). As a result, when the control lever 121 is pulled up against the urging force of the compression spring 117, the securing arm 115 is rotated clockwise and released from the securing pin 114. When the hand is released from the control lever 121, the securing arm 115 is rotated counterclockwise by the urging force of the compression spring 117 so that the securing notch 115A is secured by the securing pin 114.

Figure 3:
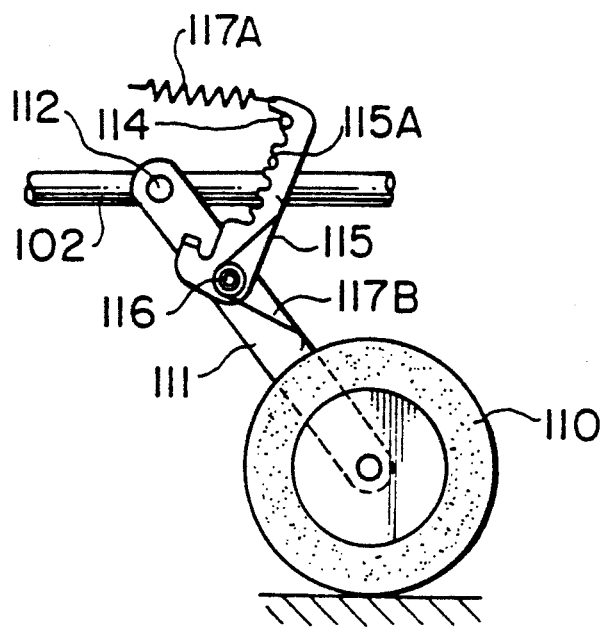
FIG. 3 is a partially enlarged view which illustrates a modification to the spring shown in FIGS. 1 and 2.

FIG. 3 shows a modification of a spring for urging the securing arm 115 toward the securing spring 114. In this modification, a coiled tension spring 117A may be used instead of the compression spring 117, alternatively a compression-type torsion spring 117B may also be used.

Then, a manner for adjusting the vertical position of the rear wheel of the edger according to this embodiment will now be described.

As shown in FIG. 1, when the edging operation is conducted along the curbstones H the level of which is different from flat area B, the front wheel 103 and the rear wheel 104 on the same side (the right side of the main frame 102) as that on which the rotary blade 105 is positioned are grounded on the curbstone H. Assuming that the rear left wheel 110, when viewed in FIG. 1, is at the same height (as designated by a phantom line of FIG. 2) as that of the rear right wheel 104 in this state, the front left wheel 103 and the rear left wheel 110 project sidewardly over the curbstones H and they thereby float.

Figure 2:
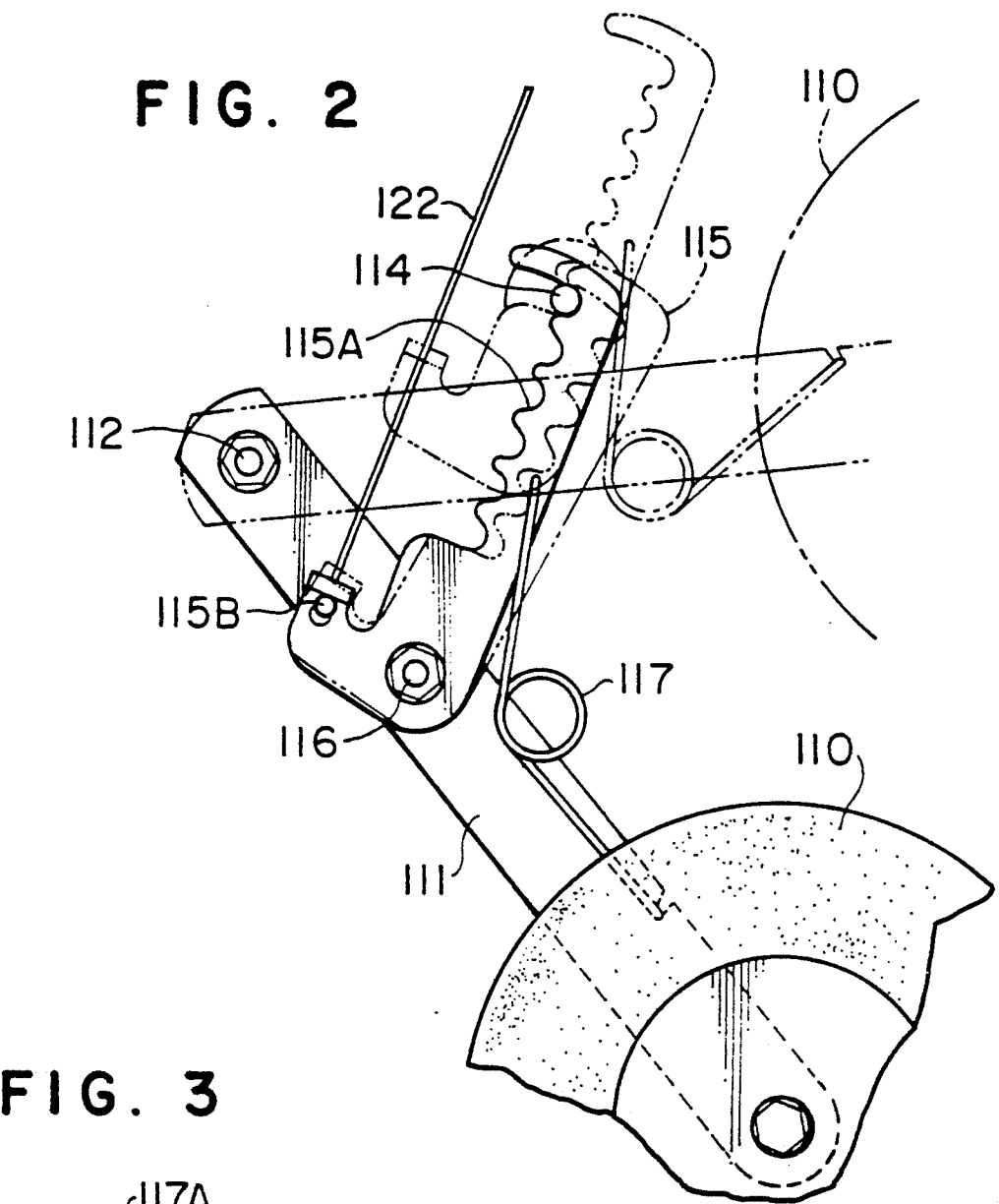
FIG. 2 is an enlarged view which illustrates an essential portion of the edger shown in FIG. 1.

When a user pulls up the control lever 121 against the urging force of the compression spring 117 while holding the handle 108 and maintaining the attitude of the edger 101 horizontally the securing arm 115 is rotated clockwise as shown by a phantom line in FIG. 2, causing the engagement established between the securing notch 115A and the securing pin 114 to be released. As a result, the supporting arm 111 is rotated clockwise centering the supporting point (the bolt/nut 112) by its dead weight, causing the rear wheel 110 to be lowered from the position designated by the phantom line to the position designated by a continuous line when viewed in FIG. 2 and grounded on the flat area B as shown in FIG. 1. When the operator releases the control lever 121, the securing arm 115 is rotated counterclockwise by the urging force of the compression spring 117. As a result, a securing notch 115A is secured by the securing pin 114 as designated by the continuous line of FIG. 2. Thus, the operation for adjusting the vertical position of the rear wheel 110 is completed. In a case where the edging operation on the curbstone H has been completed and a mowing operation on the flat area B is to be performed or the edger 101 is run, it is necessary for the above-described control lever 121 to be pulled up so as to release the engagement established between the securing pin 114 and the securing arm 115 (by means of the securing notches 115A) and the edger 101 is grounded on the flat area B. As a result, the main frame 102 is lowered by its dead weight with the rear left wheel 110 grounded on the flat area B, causing the supporting arm 111 to be rotated counterclockwise centering the supporting point (the bolt/nut 112) and becoming substantially horizontal (as designated by a phantom line) as shown in FIG. 2. Therefore, the height of the rear wheel 110 becomes substantially the same as that of the rear wheel 104 (see FIG. 1). When the control lever 121 is released, the securing arm 115 the securing sawtooth 115A of which) is secured by the securing pin 114 and the rear wheel 110 is thereby positioned. Thus, the above-described operation is completed.

Figure 4:
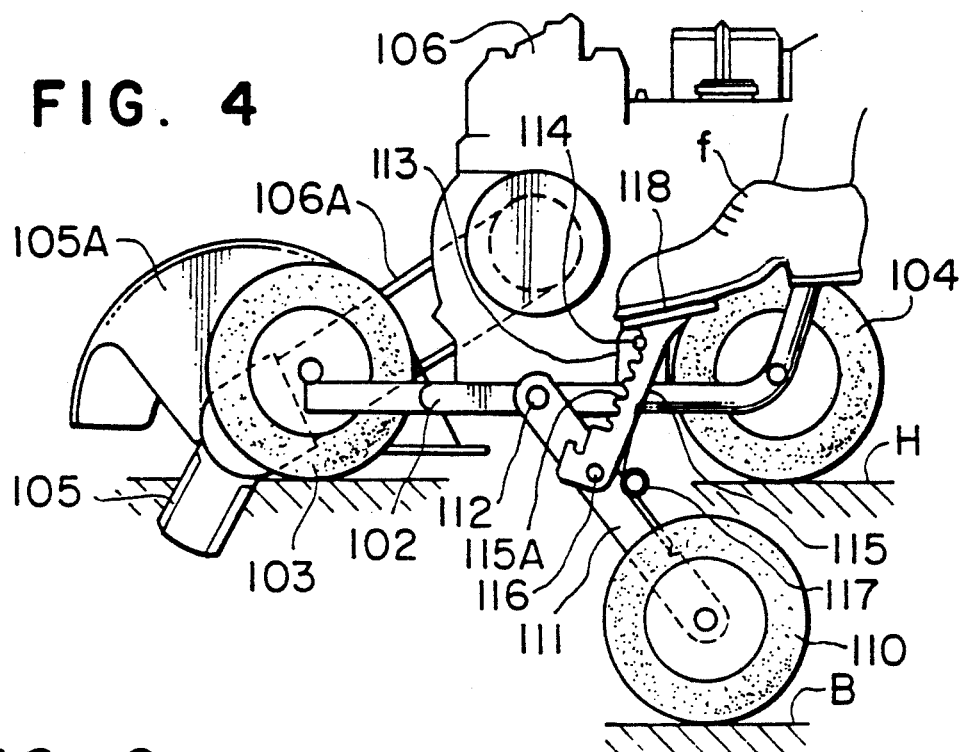
FIG. 4 is enlarged side elevational view which illustrates an essential portion of another embodiment of the present invention.

FIG. 4 illustrates another embodiment of the present invention which differs from the edger 101 according to the above-described embodiment in that means for operating the securing arm 115. That is, the control lever 121 and the control cable 121 (see FIG. 1) are omitted from the structure and a foot-operating step or pedal 118 is provided as shown in FIG. 4. The difference from the edger 101 according to the above-described embodiment lies in the structure being arranged in such a manner that securing arm 115 is operated by pressing the pedal 118 with a foot. The rest of the structure is the same as that of the above-described embodiment and therefore its description is omitted and the same elements as those according to the above-described embodiment shown in FIG. 1 are given the same reference numerals in FIG. 4. Although omitted from the illustration, a structure may be employed in which the foot-operating pedal is disposed at a position away from the securing arm 115 and the securing arm 115 can be operated via a rod or a linking mechanism by placing the foot on the pedal.

Figure 6:
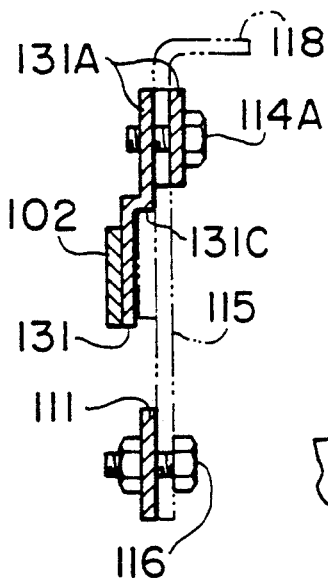
FIG. 6 is a cross sectional view taken along line 6—6 of FIG. 5.
Figure 5:
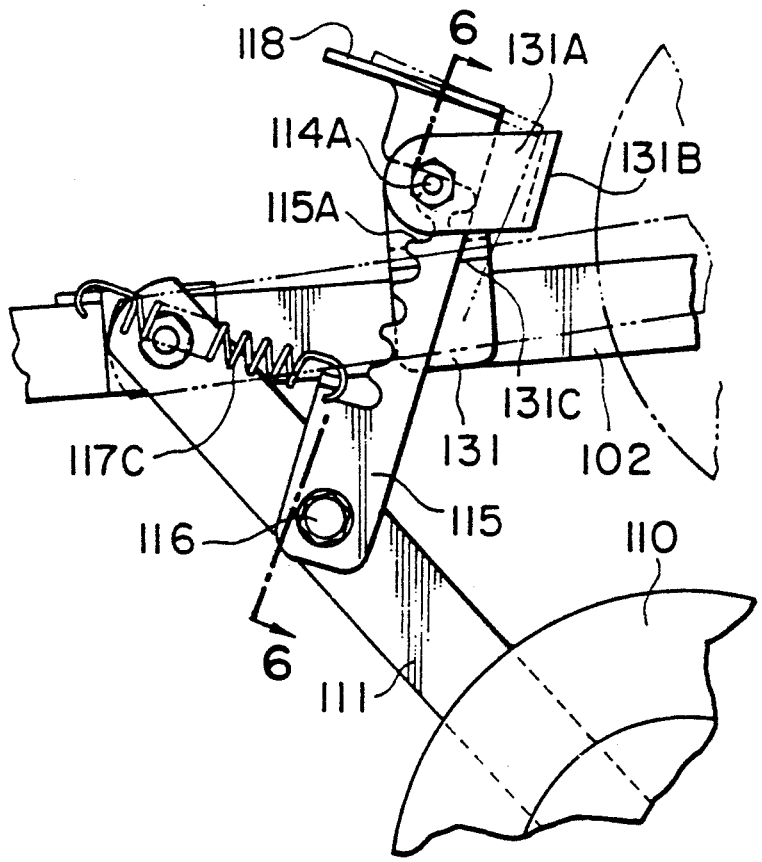
FIG. 5 is a side elevational view which illustrates an essential portion of another embodiment of the present invention.

FIGS. 5 and 6 illustrate a third embodiment of the present invention. The major difference from the above-described embodiment shown in FIG. 4 lies in that stops or stoppers 131B and 131C for respectively controlling the rotation areas of the above-described securing arm 115 and the supporting arm 111 and a guide member 131A for securing arm 115 are provided. That is, the upper portion of a supporting bracket 131, which corresponds to the above-described supporting member 113 (see FIG. 1), is designed to be a guide member 131A having a lateral cross sectional shape in the form of a substantial U-shape facing forward. Furthermore, the rear end portion of the supporting bracket 131 is designed to be a stopper 131B for stopping the securing arm 115. The securing arm 115 is longitudinally movably inserted into the guide member 131A, and a bolt 114A corresponding to the above-described securing pin 114 is fastened, by means of its thread, into the front end portion of the guide member 131A. As a result, the securing arm 115 can be rotated between the bolt 114A and the stopper 131B. The intermediate portion (in the direction of the height) of the supporting bracket 131 is, as shown in FIG. 6, designed in the form of a step so as to serve as a stopper 131C for controlling the upward rotation of the supporting arm 111. A coil tension-spring 117C is arranged between the lower portion of the securing arm 115 and the main frame 102 positioned in front of the securing arm 115 for the purpose of urging the securing arm 115 in a direction toward the bolt 114A. The other structures are the same as those according to the embodiment shown in FIG. 4, and therefore their descriptions are omitted here. The same elements as those according to the above-described embodiment shown in FIG. 4 are given the same reference numerals. According to the edger according to this embodiment, when the step 118 is applied with the foot and the securing arm 115 is thereby rotated for the purpose of adjusting the vertical position of the rear wheel 110, the securing arm 115 moves in the guide member 131A in the longitudinal direction. Therefore, it can be moved without looseness. Furthermore, since the movement of the securing arm 115 is controlled by the stopper 131B, the rotation exceeding an angular degree which is necessary to release the engagement established between the bolt 114A and the securing notch 115A is prevented. Therefore, excessive rotation of the securing arm 115 can be prevented, and it can be quickly secured by the bolt 114A. In addition, the upper limit allowed for the supporting arm 111 to rotate upwards is controlled since the supporting arm 111 is brought into contact with the stopper 131C of the supporting bracket 131. According to this embodiment, since the guide member 131A and the stoppers 131B and 131C are integrally formed with the supporting bracket 131, the number of the components can be restricted in comparison to the above-described embodiment. However, the guide member 131A and/or the stoppers 131B and 131C may be independently formed from the supporting bracket 131. According to this embodiment, the description is made about the foot-operating securing arm 115, the structure can be applied to the edger 101 arranged in such a manner that the securing arm 115 is operated (see FIGS. 1 and 2) by the control lever 121 (shown in FIG. 1).

According to the above-described embodiments, the securing arm 115 adjacent to the supporting arm 111 engages to the securing pin 114 (or the bolt 114A) adjacent to the main frame 102. However, a structure may be employed in which the securing pin 114 is disposed adjacent to the supporting arm 111 so as to be secured to the securing arm 115 adjacent to the main frame 102. The securing mechanism is not limited to the above-described structure comprising the securing pin 114 and the securing sawtooth 115A. For example, a structure may be employed in which the securing pin 114 is replaced by a U-shape securing groove member which is secured to the main frame 102 and a securing arm having a multiplicity of steps each of which can be engaged to the securing groove member is pivoted by the supporting arm 111. Another structure comprising a multiplicity of securing holes formed in the securing arm or the like at certain intervals and a securing pin which can be inserted into each of the securing holes may be employed. According to this structure, the securing pin is remote-controlled so as to insert it into a desired securing hole.

Control lever

An improvement of the control lever will now be described with reference to FIGS. 7 and 9 to 13.

Figure 13:
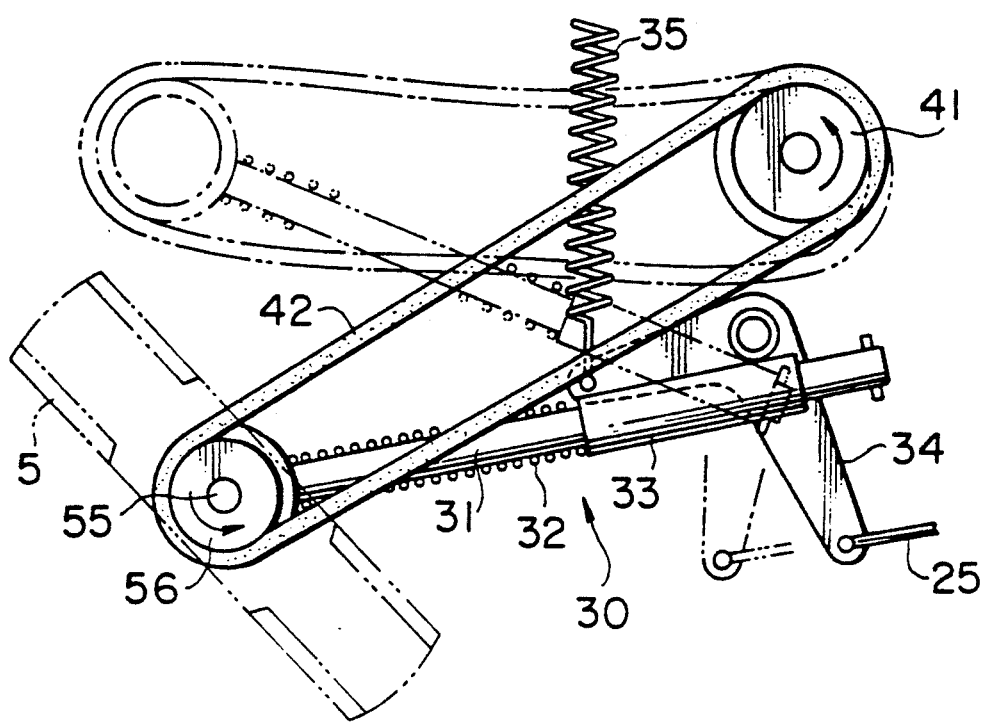
FIG. 13 is a side elevational view which illustrates a rotary blade supporting mechanism according to a conventional structure.

Referring to FIG. 7, in which the conventional structure is illustrated, reference numeral 23 represents a control lever for switching on/off the rotation of the rotary blade 5 and also setting the height of the rotary blade 5. A rod 25 is connected to the lever 23, the rod 25 being further connected to a rotary-blade supporting mechanism 30 as shown in FIG. 13. The supporting mechanism 30 rotatably holds a shaft 55 which supports the rotary blade 5 and is operatively associated with a supporting rod 31 at its front end portion. The supporting rod 31 is inserted into a swing arm 33 which is compressed by its spring 32. The swing arm 33 is integrally formed by a swing lever 34 pivotally attached to a frame, the swing lever 34 being urged upwards by a return spring 35, when viewed in FIG. 13. In addition, the lower portion of the swing lever 34 is connected to the above-described rod 25. A power transmission belt 42 is arranged between a driving pulley 41 adjacent to the engine 6 and a pulley 56 to be driven and fastened to the shaft 55 to be supported. When the swing arm 33 is positioned at a position designated by the phantom line in the upper portion of FIG. 13, the belt 42 is loosened, causing the driving pulley 41 to idle. When the swing arm 33 is moved to a position designated by the continuous line of FIG. 7, the pulley 56 (driven by the supporting shaft 55) is moved away from the driving pulley 41 by a certain distance, causing the belt 42 to be tensed. As a result, power is transmitted to the driven pulley 56 (therefore, it is transmitted to the rotary blade 5). Since a spring 32 is interposed between the swing arm 33 and the supporting rod 31, the above-described power transmission is realized even if the position to which the swing arm 33 is rotated is changed by a certain degree and the height of the rotary blade 5 is thereby Changed. Since the swing arm 33 is integrally formed with the swing lever 34 and the position to which the swing lever 34 is rotated is determined due to the tension caused by the rod 25, the power transmission to the rotary blade 5 is switched on/off (clutched) and the height of the rotary blade 5 is set by operating the control lever 23 shown in FIG. 7.

In the case where, for example, a user stops the edging operation with the edger shown in FIG. 7, the user releases the handle grip 21 and then operates the control lever 23 to stop the rotation of the rotary blade 5 before the user quits the edger. That is, the above-described edger has not been arranged in such a manner that the rotation of the rotary blade 5 is automatically stopped when a user released the hand from the handle grip. Namely, the engaged state of the clutch mechanism (the belt engagement) cannot be automatically released. Also an edger disclosed in Japanese Patent Laid-Open No. 62-236406 has not been arranged to be provided with a mechanism capable of automatically releasing the engaged clutch.

Figure 12:
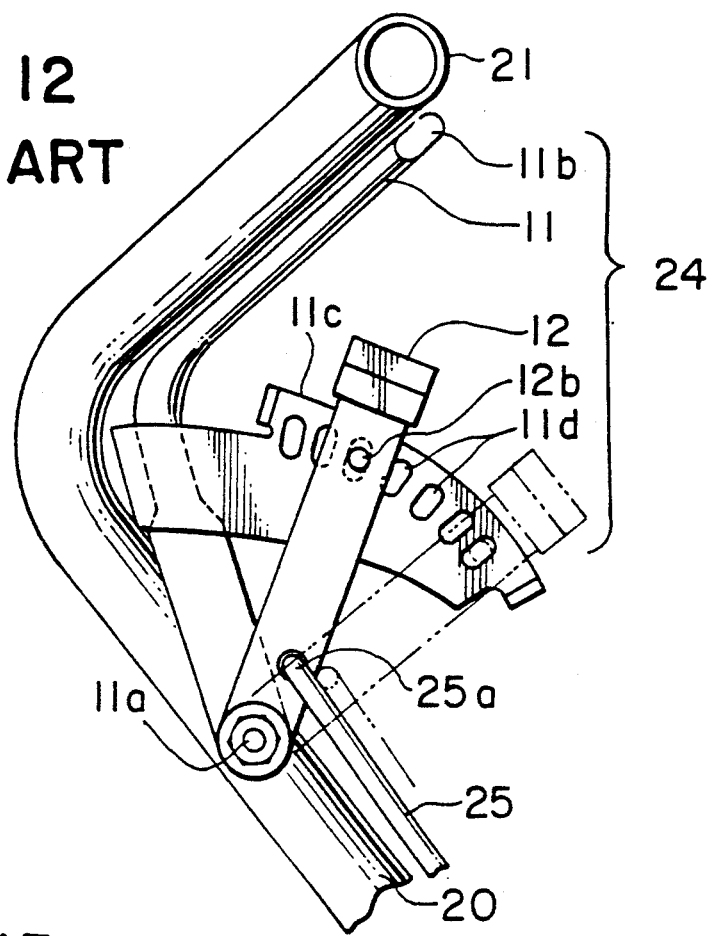
FIG. 12 is a side elevational view which illustrates another conventional control lever.

Recently, a lever 24 as shown in FIG. 12 serving as a control lever capable of automatically releasing the engaged clutch for an edger and a mower, has been available. The above-described lever 24 is provided for, for example, the edger shown in FIG. 7, the lever 24 comprising a rod serving as a second lever 12 connected to the rod 25 and setting the height of the rotary blade 5 similarly to the above-described lever 23. The second lever 12 is fastened to a first lever 11 which can be gripped together with the handle grip 21 as shown in FIG. 7. In order to set the height of the rotary blade 5, a bracket 11c, having a plurality of securing holes 11d which can be secured by a pin 12b on the side surface of the second lever 12, is integrally formed with the first lever 11. When the pin 12b is inserted into a selected hole 11d, the angle made by the second lever 12 with respect to the first lever 11 can be changed. As a result, the second lever 12 can be rotated together with the first lever 11. When the first lever 11 is gripped together with the handle grip 21, the second lever 12 is rotated to an angle set by the engagement between the pin 12b and the hole 11d, causing the rod 25 to be attracted. As a result, the power can be transmitted to the rotary blade 50 and the height of the rotary blade 50 can be set.

According to the above-described control lever 24, when an operator releases the hand from the handle grip 21 gripped together with the first lever 11, the swing arm 33, the rod 25 and the like are immediately returned to the original position (the position designated by a phantom line of FIG. 13) by the action of the return spring 35 (or similar urging or biasing means) shown in FIG. 13. As a result, the rotary blade 5 is raised and the power transmission to the same is stopped. That is, according to the edger provided with the above-described control lever 24, the automatic clutch release can be realized. Hitherto, the first and the second levers 11 and 12 of the above-described control lever 24 have been rotatably fastened to the frame 2 at a common supporting point 11a as shown in FIG. 12.

Although the above-described control lever 24 (see FIG. 12) has an advantage in that the automatic clutch release can be realized in an operating machine such as the edger, its structure has not been arranged such that the fatigue of the operator can be satisfactorily prevented by reducing the grasping power necessary to operate the control lever 24. According to the above-described control lever 24, the distance from the supporting point 11a to a grip point 11b of the first lever 11 is arranged to be relatively larger than the distance from the supporting point 11a to a junction 25a of the rod 25. Therefore, the grasping power necessary for an operator to operate the control lever is reduced by utilizing the principle of the lever. However, the following two factors are left unsettled:

(1) The grasping power necessary for a relatively long time during the operation cannot be reduced in comparison to the grasping power necessary for a short time when the rotary blade 5 (see FIGS. 7 and 13) is started. The load moment acting from the rod 25 on the first lever 11 via the second lever 12 is proportional to the length of the lever from the supporting point 11a to the rod 25, that is, to the length of the perpendicular drawn from the supporting point 11a to the rod 25. Therefore, in the case where the second lever 12 is positioned to a position designated by a phantom line of FIG. 12, force necessary to attract the first lever 11 in the direction toward the handle grip 21 becomes the maximum level in a gripping state shown in FIG. 12. Since the operator must grip the grip portion 11b of the first lever 11 together with the grip 21 during the operation, the operator is sometimes fatigued if the force (grasping power) necessary in the above-described gripping state is so very large.

(2) Since the length of the lever from the supporting point 11a to the rod 25 in the state where the first lever 11 is, together with the grip 21, gripped is made different depending upon the setting angle of the second lever 12, the load moment in the above-described gripping state varies considerably. This leads to a fact that the grasping power necessary for the operator during the operation becomes different whenever the angle of the second lever 12 is changed. Therefore, the user feels displeasure at the time of the operation.

In order to reduce the force necessary to operate the first lever 11, it might therefore be considered feasible to employ means (omitted from illustration) arranged such that the length of the first lever 11 from the supporting point 11a to the gripping portion 11b is further elongated. Alternatively, a means (omitted from illustration) may be employed arranged such that the second lever 12 is formed independently from the first lever 11 to form a lever consisting of two steps which are connected by an intermediate rod. However, according to the former structure, the length in which the lever 11 rotates is enlarged proportionally to the length (the size) of the lever 11. According to the latter structure, since the second lever 12 is positioned away from the hand of the operator (from the portion adjacent to the handle grip 21), the handling facility deteriorates.

The above-described problems experienced with the control lever is not limited to edgers and mowers. The above-described problems are common to the operation of machines having such a start/stop operation in which the operation mode occurs by the displacement of a rod or wire by operating a control lever and the desired operation is performed by gripping a handle grip.

Figure 9:
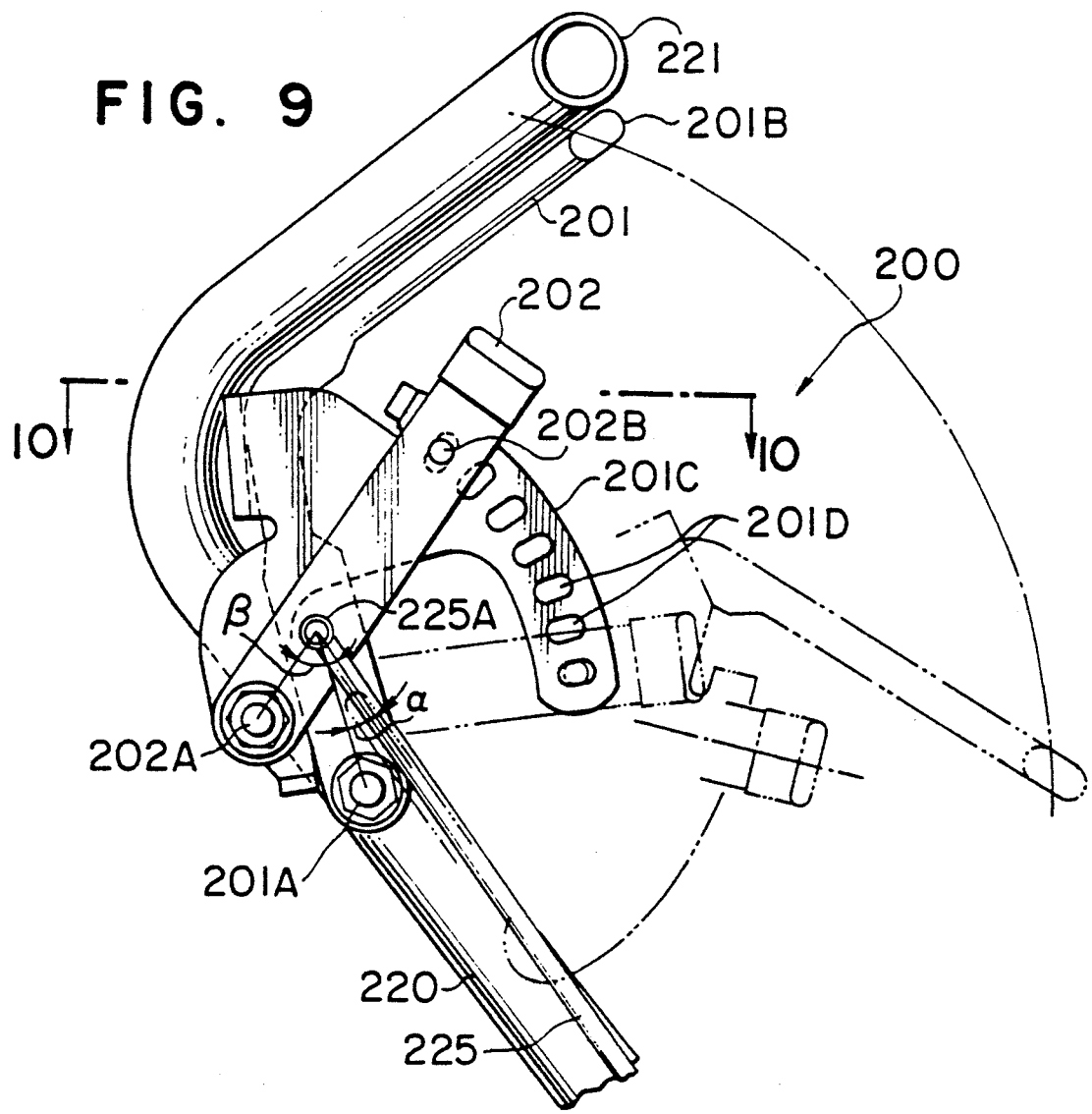
FIG. 9 is a side elevational view which illustrates a modification of a control lever of an edger according to the present invention.
Figure 10:
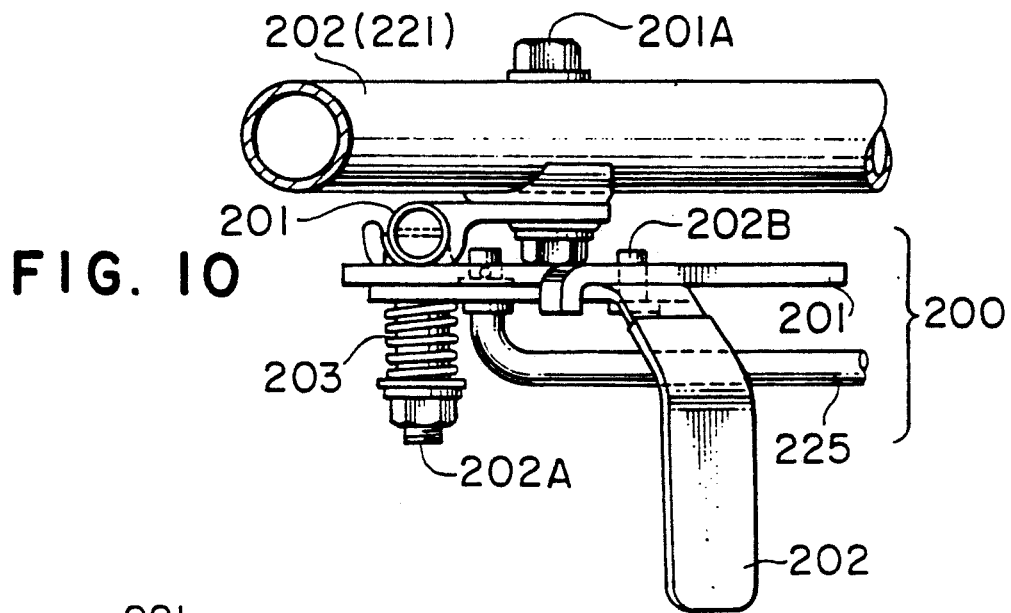
FIG. 10 is a cross sectional view taken along line 10—10 of FIG. 9.

FIGS. 9 and 10 are respectively a side elevational view and a plan view which illustrate a control lever means or arrangement 200 according to the present invention. The control lever arrangement 200 is disposed in the vicinity of a handle grip 221 in an edger arranged similarly to that shown in FIG. 4. Since the rod 225 is connected to the lever arrangement 200 and also is connected to the rotary-blade supporting mechanism 30 as shown in FIG. 13, the rotation of the rotary blade 5 can be switched on/off and the height of the rotary blade 5 can be set similarly by operating the lever arrangement 200.

When the operator release his hand from the handle grip, the first and the second levers return to their original positions together with the rod or the wire so that the clutch may automatically be released.

Further, since the second lever is attached on the first lever and both levers are provided adjacent to the handle grip, the device can be made compact and it is possible to operate them near the operator's hand.

Referring to FIG. 9, reference numeral 201 represents a first lever rotatably fastened to a frame 220 at a supporting or mounting pivot point 201A comprising a bolt/nut or the like. Reference numeral 202 represents a second lever fastened to the first lever 201 via a fastening supporting or pivot point 202A and connected to the rod 225 at a junction 225A. A bracket 201C having a plurality (seven according to this embodiment) of securing holes 201D for the purpose of optionally setting the second lever 202 with respect to the first lever 201 is integrally formed with the first lever 201. A projecting pin 202B which can be inserted into one of the plurality of securing holes 201D is formed on the side surface of the lever 202. A spring 203 is interposed as shown in FIG. 10 in addition to the above-described bolt/nut to serve as the fastening pivot point 202A.

As shown in FIG. 9, the grip portion 201B of the first lever 201 is rotated from a position (a position designated by a phantom line) away from the handle grip 221 to a position (a position designated by a continuous line) at which it is gripped together with the grip 221 during the operation with the edger relative to the supporting point 201A. When the pin 202B is inserted into a selected one of the holes 201D formed in the bracket 201C integrally formed with the first lever 201, the second lever 202 rotates, together with the lever 201, by an angular degree corresponding to the selected hole 201D. Therefore, a displacement corresponding to the above-described rotation is given to the rod 225. The reason for the interposing of the spring 203 (see FIG. 10) at the fastening supporting pivot point 202A lies in that the structure is arranged in such a manner that the lever 202 is urged by the spring 203 so as to cause the pin 202B to be inserted into the securing hole 201D formed in the lever 201 so that the hole 201D (therefore, the setting angle for the lever 202) is changed by operating the lever 202 against the urging force of the spring 203. In order to reduce, by utilizing the principles of the lever, the force to rotate the first lever 201 against the force which acts on the rod 225 as a load, the length of the lever 201 is arranged to be a proper length. Furthermore, the junction 225A for the rod 225 is positioned adjacent to the fastening supporting point 202A and the supporting point 201A.

The control lever arrangement 200 is characterized in that the fastening pivot point 202A rotatably connecting the second lever 202 to the first lever 201 is provided independently from the mounting pivot point 201A at which the first lever 201 is supported on the frame 220. The position of the fastening pivot point 202A is determined so as to meet the following two conditions in the case where the lever 201 is gripped together with the handle grip 221:

(a) Angle α made between the direction from the junction 225A of the rod 225 on the second lever 202 toward the mounting pivot point 201A at which the first lever 201 is supported and the longitudinal direction of the rod 225 is an acute angle regardless of the setting angle of the lever 202 (regardless of the securing hole 201D)

(b) Angle β made between the direction from the junction 225A toward the fastening supporting point 202A and the longitudinal direction of the rod 225 is substantially 90° when the second lever 202 is fastened in the vicinity of the central portion (for example, it is secured to a central hole of the seven securing holes 201D) of the setting angle range for the second lever 202.

The fact that the condition (a) is satisfied means that force necessary in the state where the first lever 201 is, together with the handle grip 221, gripped by the hand is smaller than the previous force necessary to operate (to rotate) the lever 201. In addition, the fact that the condition (b) is satisfied means that force necessary in the above-described gripping state is made constant regardless of the setting angle for the second lever 202.

Then, the above-described two factors will now be described with reference to FIG. 11.

Figure 11:
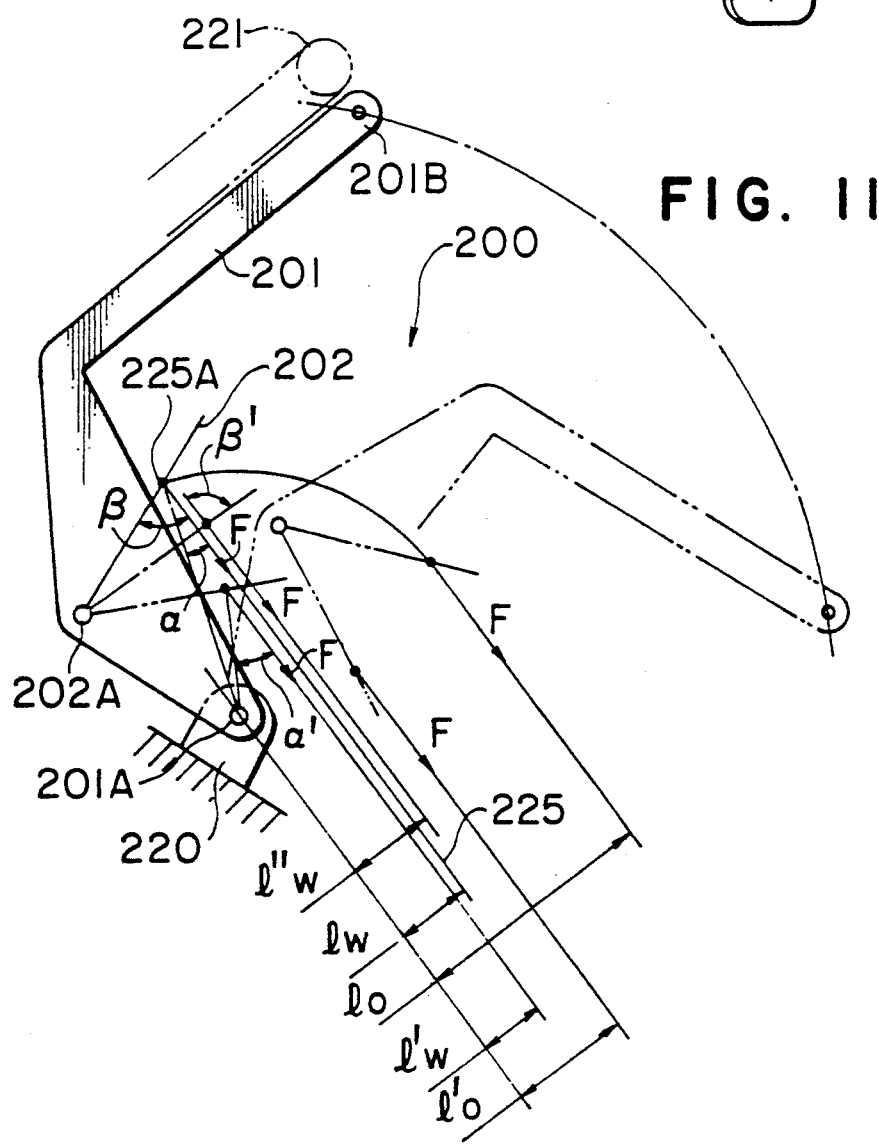
FIG. 11 is a schematic view which illustrates the control lever shown in FIG. 10.

FIG. 11 schematically illustrates the control lever 200, the same elements as those shown in FIGS. 9 and 10 are given the same reference numerals. Angles α, α', β and β' correspond to the above-described angles α and β. Symbols lw, lo, l'w, l'o and l"w respectively represent the lengths (the lever length) of perpendiculars drawn from the supporting point 201A to the rod 225 in which lw, l'w, and l"w respectively represent the lengths of the perpendiculars when the first lever 201 is, together with the handle grip 221, gripped in the cases where the second lever 202 is fastened to the two ends and the central position of the setting range. Symbols lo and l'o represent the lengths of the perpendiculars when the lever 201 is released in the case where the lever 202 is positioned at the two ends of the above-described range. Symbol F represents force of the rod 225 acting on the junction 225A as a load. The load moment acting on the control lever 200 is the product of the above-described lever length and the force F. The force necessary to operate the lever 200 against the load moment, that is, the force to attracting the grip portion 201B of the first lever 201 toward the grip 221 is obtained by dividing the above-described moment by the distance from the supporting point 201A to the grip portion 201B.

The above-described condition (a) means the fact that the angle o shown in FIG. 11 is an acute angle regardless of the setting angle for the lever 202, that is, the largest angle α' is an acute angle (it is about 30° here). In order to meet the above-described condition, the lever length lw and l'w in the state where the lever 201 is gripped together with the grip 221 are, as shown in FIG. 11, respectively shorter than the lever lengths lo and l'o in the state where the same has not been gripped yet. Since the load moment is enlarged/reduced in accordance with the above-described lever length, the force necessary when the first lever 201 is gripped together with the grip 221 can be made further smaller than the previous force necessary when the lever 201 is operated (rotated).

On the other hand, the condition (b) means the fact that the angle $\beta'$ of the angle $\beta$ when the lever 202 is positioned in the vicinity of the center position of the setting angle range becomes about 90°. Therefore, the above-described lever length relating to the load moment in the above-described gripping state is changed in only a narrow range from l'w (or lw) to l"w as illustrated. As described above, this means a fact that the force necessary in the gripping state is constant regardless of the setting angle for the lever 202.

According to this embodiment, the control lever 200 for the rotary blade of the edger is described, the present invention is not limited to the above-made description. The present invention can be employed widely as means for switching on/off the operation of a variety of operating machines and setting the operation mode of the same by using a rod (or a wire). For example, the structure according to this embodiment can be employed as a control lever for switching on/off (clutching the engine) the operation of the cultivator tooth of a cultivator and setting the depth in the earth or a control lever serving as a clutch lever and a speed change lever.

Main frame

An improvement in the main frame will now be described with reference to FIGS. 14 to 20.

Figure 18:
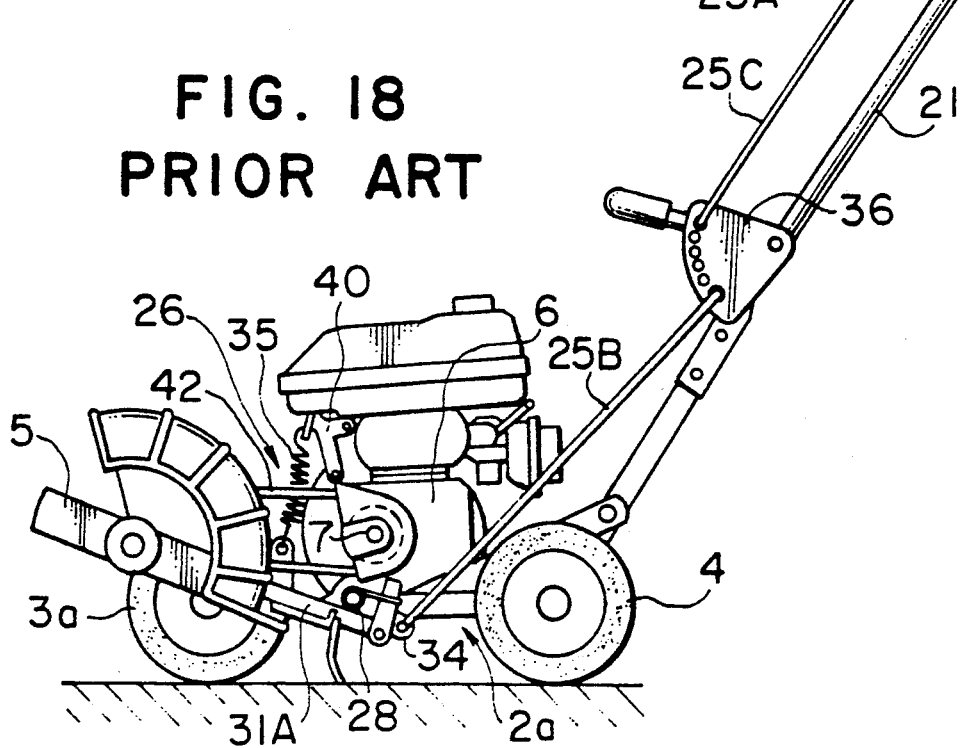
FIG. 18 is a side elevational view which illustrates an edger having the conventional frame.

FIG. 18 is a side elevational view which illustrates a conventional edger arranged such that the engine 6 is mounted on a main frame 2a and a front wheel 3a and two rear wheels 4 are provided as the running wheels and the rotary blade 5 is provided in the front portion on the left side of the edger. The rotary blade 5 is, via a belt driving device 26, connected to an output shaft 7 of the engine 6, the rotary blade 5 being further supported at the front end portion of a rotary-blade supporting arm 31A. The rotary-blade supporting arm 31A is supported by a supporting shaft 28 such that it can move vertically, the rotary-blade supporting arm 31A being constructed to be telescopic in the lengthwise direction. Furthermore, the rotary-blade supporting arm 31A includes a tension spring for urging or biasing in the elongating direction (omitted from illustration). When the thus constituted rotary-blade supporting arm 31A is lowered, the rotary blade 5 can be lowered to the operation position and the distance between two pulleys for the belt driving device 26 is lengthened, causing the belt 42 to be engaged. The rotary-blade supporting arm 31A is connected to a clutch lever 23A of the operation handle 21 via the control lever 34, a control rod 25B, the adjustable relay lever 36 and a rod 25C. The rotary-blade supporting arm 31A is urged upwards by the return spring 35 toward a disengagement position so that the rotary blade 5 is returned to the upper portion at the time of the release of the clutch. The top end portion of the return spring 35 is secured to a bracket 40 provided on the engine 6.

Figure 19:
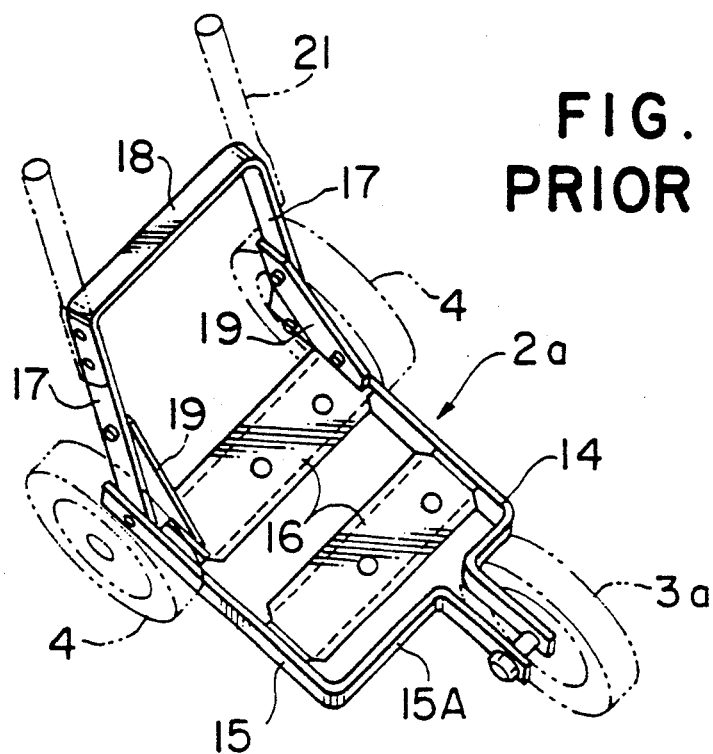
FIG. 19 is a perspective view which illustrates a frame employed by the edger shown in FIG. 18.

FIG. 19 illustrates the conventional main frame 2a employed in the edger shown in FIG. 18, the main frame 2a being constituted by a plurality of frame members manufactured by sheeting. That is, the outer frame is constituted by side frames 14 and 15 which respectively serve as the right member and the left member designed independently and manufactured by sheeting. A pair of sheet metal engine mounting frames 16 are welded between the side frames 14 and 15. A fitting stay 17 for fitting a U-shaped sheet metal operation handle 21 and a handle 18 integrally formed with the fitting stay 17 and arranged for raising the edger body are secured by a bolt. Furthermore, reinforcing frames 19 are secured between the stay 17 and the side frame 14 and between the stay 17 and the side frame 15. According to the above-described structure arranged in such a manner that the main frame 2a is manufactured by sheeting, the following problems arises:

(1) Since the sheet metal frames has poor rigidity, the thickness of the frame must be enlarged for the purpose of obtaining the strength and the vibration resistance. Furthermore, since the number of the components is too large and the components must be coupled to each other, the weight of a frame 2a becomes too large and the assembling of the components takes too long a time.

(2) In particular, in the case of a three wheel type of frame, as shown in FIG. 19, a large torsional load acts on the portion at which the front wheel is supported. Therefore, the thickness of the frame must be further increased.

(3) A frame 17 independently provided from the outer frames 14 and 15 must be prepared so as to be fastened as the operation handle fitting member.

(4) When the edger body is raised by the hands of an operator, the operator inevitably has an ache in the hand if the operator holds both the edger-body raising handle 18 disposed in the rear portion of the edger body shown and a bent portion 15A positioned in the front portion of the edger body since both of the above-described components are made of sheet metal.

Figure 20:
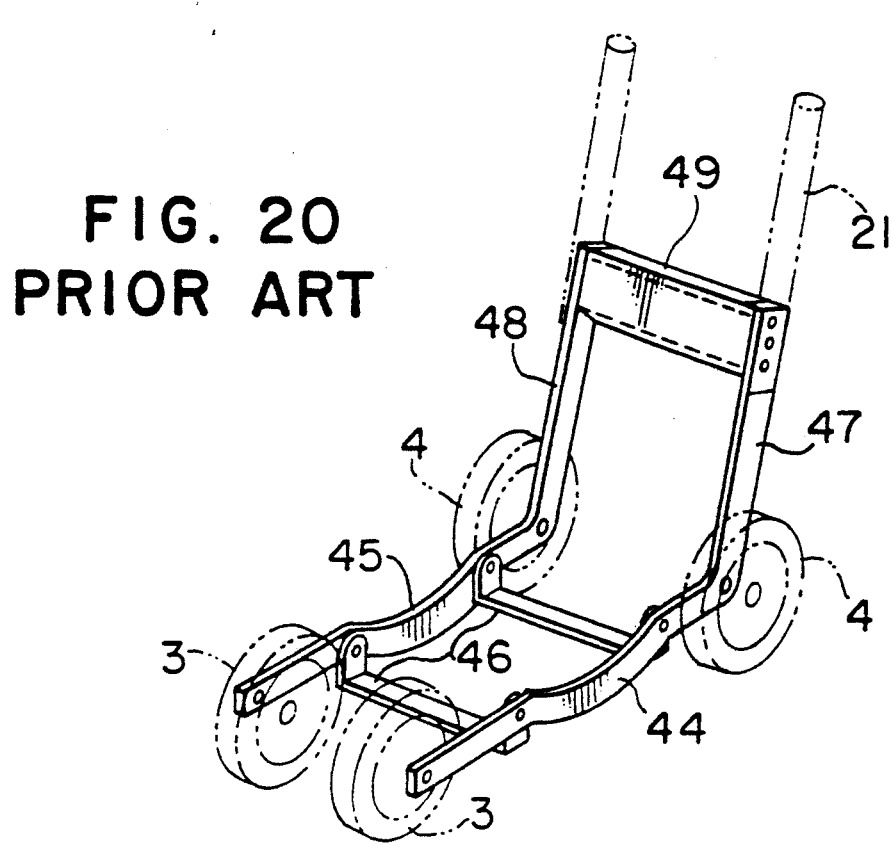
FIG. 20 is a perspective view which illustrates a conventional frame.

FIG. 20 illustrates another conventional example in which the left side frame 44 and the left side operation handle fitting stay 47 are integrally formed by sheeting, while the right side frame 45 and the right side operation handle fitting stay 48 are integrally formed by sheeting. The two stays 47 and 48 are connected to each other by the edger-body raising handle 49 and connecting frames 46. Furthermore, the wheel shafts of front wheels 3 are respectively supported at the projection portions of the side frames 44 and 45 in a cantilever manner.

However, the above-described structure raises a problem in terms of the increase in weight since the overall body of the frame is made of sheet metal. Furthermore, since the side frame 44 and 45 and the stays 47 and 48 are integrally formed by press forming as described above, the material cannot be economically cut out. Furthermore, a front-portion raising handle must be additionally provided for the purpose of raising the edger body. In addition, since the rear-portion raising handle frame 49 is made of sheet metal, the operator has an ache in the hand.

A frame formed by utilizing a pipe has been disclosed, for example, in Japanese Patent Laid-Open No. 62-164729. However, according to this disclosure, sheet metal independent members are welded as the front wheel shaft supporting portion, the operation handle fitting stay and the like. Furthermore, the edger body raising handle or the like is not provided.

Figure 14:
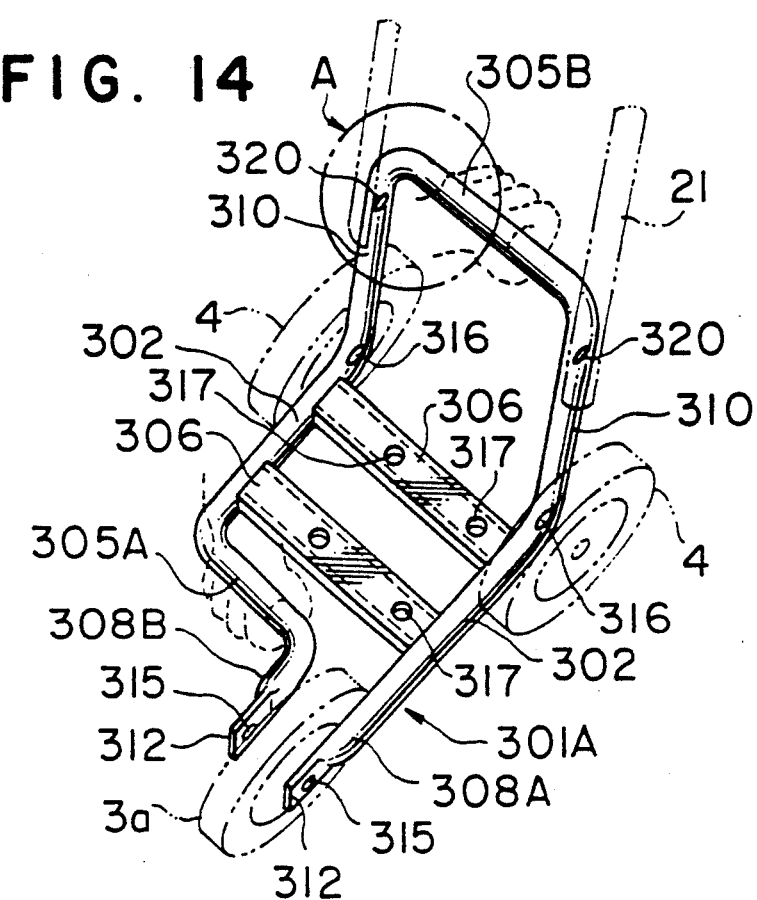
FIG. 14 is a perspective view which illustrates an improved frame of the edger according to the present invention.

FIG. 14 illustrates a main frame 301A for an edger according to an embodiment of the present invention. The outer frame portion of the main frame 301A is constituted by a pipe frame 302 integrally forming the right and the left side portions and the front and the rear bent portions 305A and 305B. The pipe frame 302 is made of a pipe having a circular cross sectional shape, and the above-described two bent portions 305A and 305B runs substantially parallel to the wheel shaft. Two engine mounting frames 306 are welded between the right and the left side portions of the pipe frame 302 at a certain interval. The engine mounting frame 306 is arranged to have a U-shape cross sectional shape facing downwards by a bent sheet metal material. The engine mounting frame 306 is further arranged to have a flat top surface for easily mounting the engine, the top surface having holes 317 for inserting engine mounting bolts.

The rear portion of the pipe frame 302 is bent upwards so that an operation handle fitting stay portion 310 is integrally formed.

The front left portion of the pipe frame 302 is extended forwards so as to integrally form a front wheel shaft supporting portion 308A. The front right portion of the pipe frame 302 approaches the front left portion of the pipe frame 302 via the above-described front bent portion 305A so that a front wheel-shaft supporting portion 308B extending forwards in parallel to the above-described front wheel-shaft supporting portion 308A is formed. The above-described front wheel-shaft supporting portions 308A and 308B form, by caulking, a vertical flat portion 312 at their front portions. Each of the flat portions 312 has a hole 315 for fitting the front-wheel shaft so that the wheel-shaft of the front wheel 3a is supported.

Each of the lower end portions of the stay portion 310 has a hole 316 for fitting the rear wheel-shaft so that the wheel shafts of the rear right and the rear left wheels 4 are respectively supported.

Figure 15:
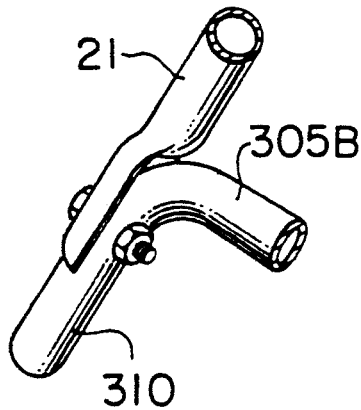
FIG. 15 is an enlarged view which illustrates the portion A of FIG. 14.

The upper portion of each of the stay portions 310 has, for example, a hole 320 for fitting an operation handle 21, the operation handle 21 being fastened by bolts as shown in FIG. 15.

Since the basic structure of the edger according to this embodiment is arranged similarly to the case shown in FIG. 18, the description is omitted here.

When the edger body is raised, the front bent portion 305A and the rear bent portion 305B are, as the handles for raising the edger body, held by the hands. Since each of the bent portions 305A and 305B is made of a pipe, the user does not have an ache in the hands.

Figure 16:
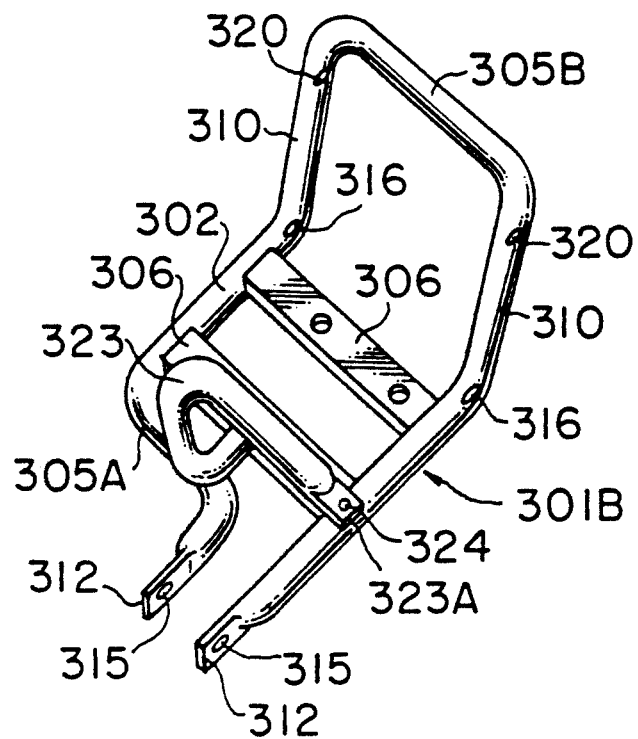
FIG. 16 is a perspective view which illustrates another modification to the frame.

FIG. 16 illustrates a main frame 301B according to another embodiment of the present invention. The main frame 301B has the structure comprising the pipe frame 302, the engine mounting frame 306 made of sheet metal and the like which are similar to those shown in FIG. 14. Furthermore, the main frame 301B has a front edger-body raising handle 323 made of a pipe and independently formed from the pipe frame 302, the front edger-body raising handle 323 being welded to the front portion thereof. The above-described front edger-body raising handle 323 is made of a pipe having a circular cross sectional shape and is welded at its two points to the front engine-mounting frame 306 and the front bent portion 305A at the substantially central portion in the lateral direction of the main frame 301B. The edger-body raising handle 323 extends upwards and is bent to the left at its top end portion. The left end portion of the front edger-body raising handle 323 is formed in a horizontal flat portion 323A formed by caulking, the flat portion 323A having a hole 324 for securing the return spring.

Figure 17:
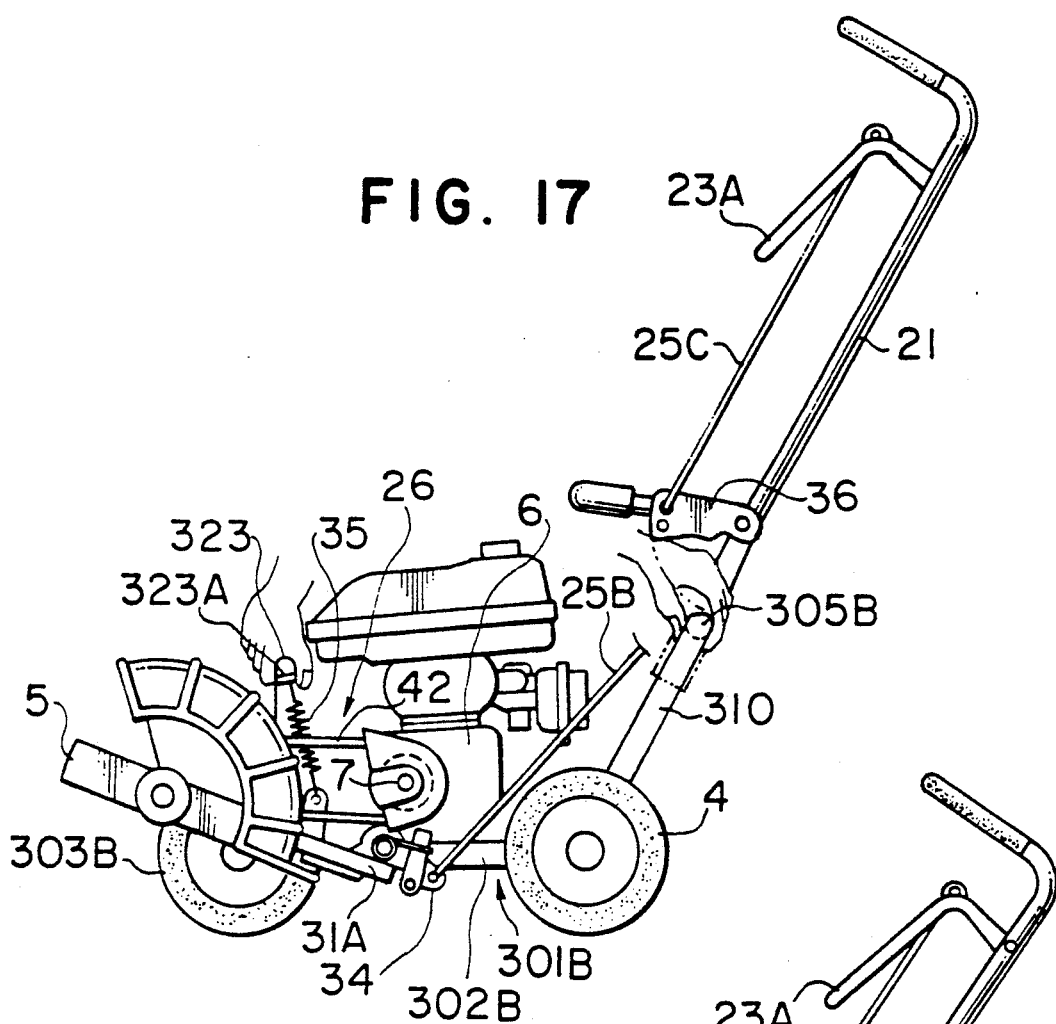
FIG. 17 is a side elevational view which illustrates an edger having the frame shown in FIG. 16.

FIG. 17 is an overall side elevational view of the edger having the main frame 301B shown in FIG. 16. The top end portion of the return spring 35 for the rotary blade supporting arm 31A is secured to the left end portion of the front edger-body raising handle 323.

Since the structures except the structure of the main frame 301B and the structure for fitting the return spring 35 are the same as those for the above-described structure shown in FIG. 18, the same elements are given the same reference numerals and the descriptions of the clutching operation or the like are omitted here.

When the edger body is raised, the front edger-body raising handle 323 and the rear bent portion 305B are, as shown in FIG. 17, held by the hands. Since each of the handle 323 and the bent portion 305B is made of a pipe, the user does not have an ache in the hands.

Return spring fitting structure

Then, an improvement in the structure for fitting the return spring will now be described with reference to FIGS. 21 to 29.

Figure 27:
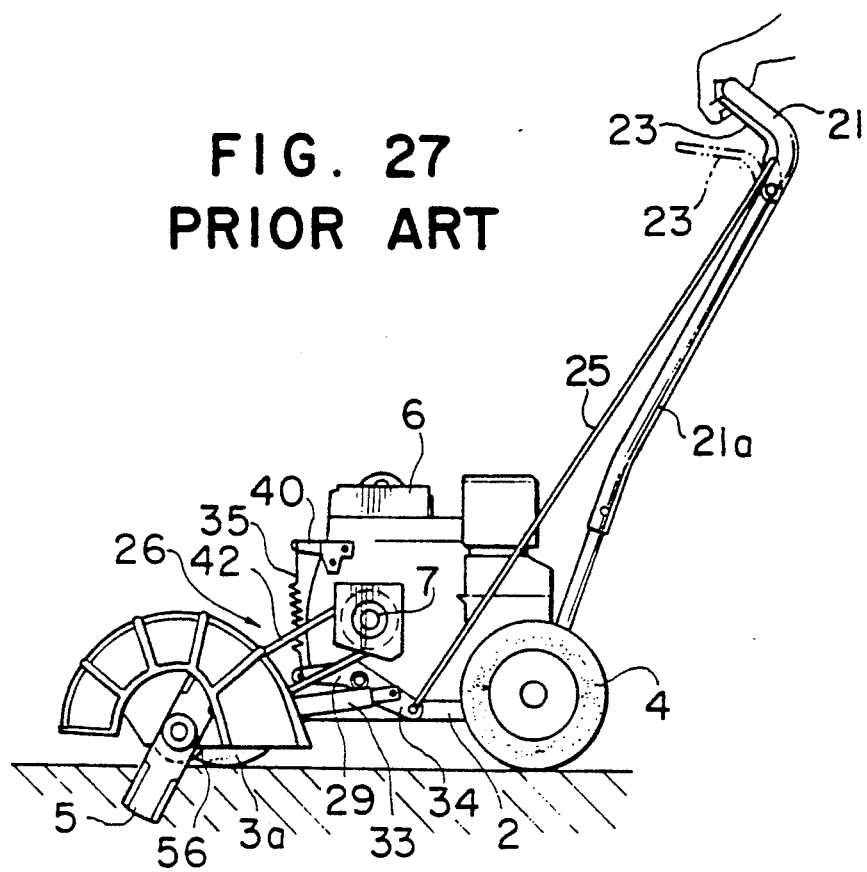
FIG. 27 is a side elevational view which illustrates the edger having a conventional return spring fitting structure.
Figure 28:
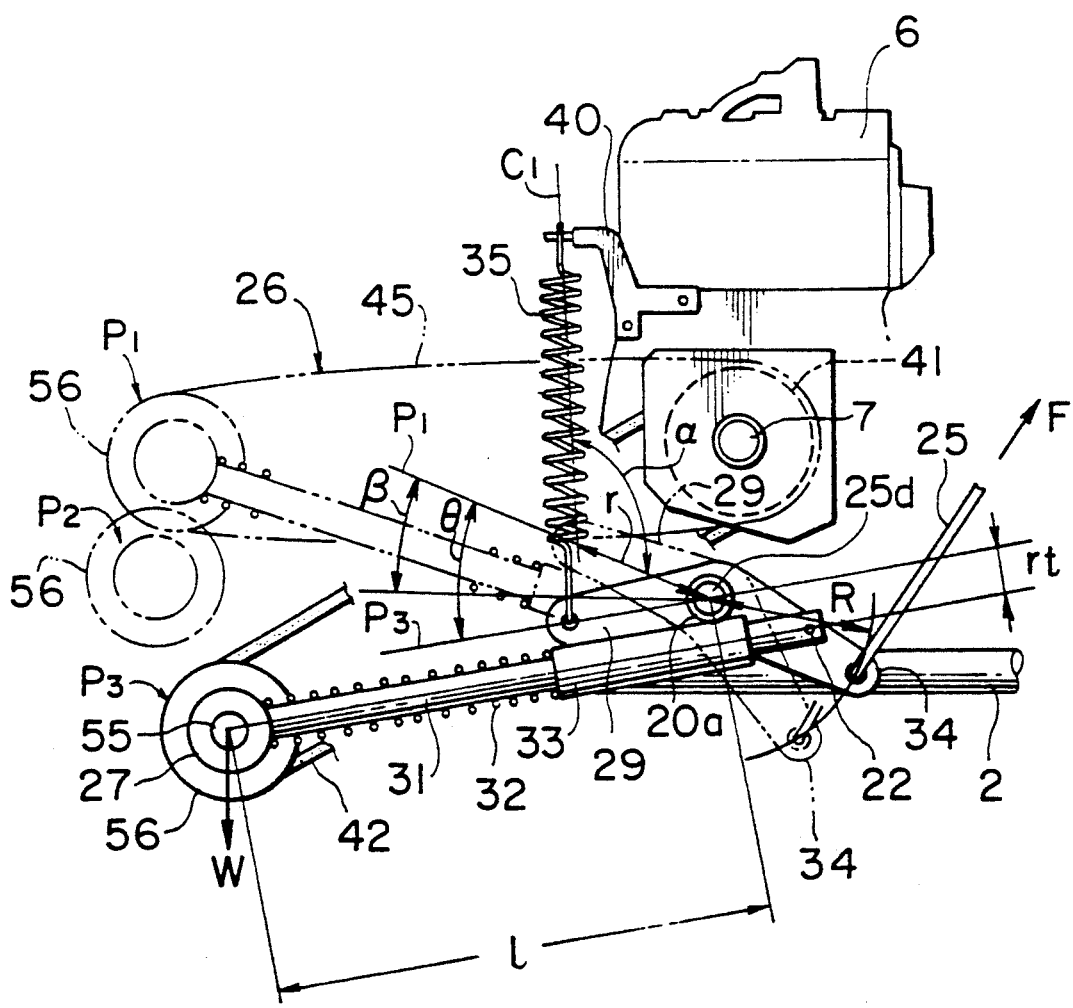
FIG. 28 is an enlarged side elevational view which illustrates a conventional return fitting structure employed by the edger shown in FIG. 27.

FIG. 27 is an overall side elevational view which illustrates an example of a conventional edger. FIG. 28 is an enlarged view of an essential portion of FIG. 27. Referring to these drawings, the basic structure of the edger and the conventional structure or fitting the return spring will now be described. Referring to FIG. 27, the engine 6 is mounted on the main frame 2, and the two rear wheels 4 and one front wheel 3a are provided for the main frame 2. A longitudinal cutter 5 is disposed, for example, in the front left portion of the main frame 2, the cutter 5 being connected to a drive shaft (an engine output shaft) 7 via the belt driving device 26.

Referring to FIG. 28, the belt driving device 26 comprises a driving pulley 41 secured to the drive shaft (the engine output shaft) 7, a pulley 56 to be driven disposed in front of the driving pulley 41 and secured to a shaft 55 to be driven and a driving belt 42 arranged between the above-described two pulleys 41 and 56. The shaft 55 to be driven is rotatably supported by a bearing 27 and to which the above-described cutter 5 (see FIG. 27) is secured.

The rod 31 extending rearwards is secured to the bearing 27, the rod 31 being inserted into the cylindrical swing arm 33 in such a manner that it can slide in the longitudinal direction. The rod 31 is urged by a tension spring 32 disposed, with compression, between the bearing 27 and the swing arm 33 in the forward direction, that is, in the direction in which the distance between the two pulleys 41 and 56 is greatest. A stopper pin 22 is secured to the rear end portion of the rod 31.

The swing arm 33 is supported in such a manner that it can swing vertically centering a supporting shaft 25d positioned below the driving shaft 7, the swing arm 33 being connected to a control lever 34 via an embossed portion 20a in such a manner that it can move integrally with the control lever 34.

The control lever extends rearwards in a substantially downward direction, the control lever 34 having a top end portion in which a spring fitting arm 29 extends forward, is integrally formed. The above-described spring fitting arm 29 has the front end portion to which the lower end portion of the return spring 35 is secured. The return spring 35 is disposed in front of the engine 6 and extends upwards, the return spring 35 having the top end portion secured to a bracket 40 secured to the engine 6 so that the fitting arm 29 is urged upwards.

The rod 25 is connected to the lower end portion of the control lever 34, the control rod 25 extending upward as shown in FIG. 27 and connected to the clutch lever 23.

According to the edger, when the clutch lever 23 is raised from the operation start position (the disengagement position), designated by a phantom line, to the operation position, designated by a continuous line, the belt 42 is engaged and both the pulley 56 to be driven and the cutter 5 are lowered. Then, the edging operation is conducted with the clutch lever 23 gripped together with the handle grip 21.

According to the conventional structure for fitting the return spring, the spring is, as shown in FIG. 28, arranged in such a manner that angle $\alpha$, made between an axis C1 of the return spring 35 and the spring fitting arm 29 at the operation start portion P1, designated by the phantom line, is arranged to be larger than 90°. Therefore, a large force is necessary to grip the clutch lever at the time of the edging operation, causing an operator to be fatigued. Furthermore, since a large force is necessary to operate the clutch lever 23, the operator must operate the clutch lever 23 with a large force. In addition, the difference in the grasping power required between the operation start time and during the operation, causes an operator to feel that the clutch lever 23 does not work smoothly.

The above-described matter will now be described in detail. Referring to FIG. 28, it is provided that a lever operation angle is $\theta$, the weight of cutter head is W, the position of the center of gravity of the cutter head is (, the spring constant of the tension spring 32 is Kt, its displacement is Et, the fitting radius of the spring is rt, the spring constant of the return spring 35 is Kr, its displacement is Er, the fitting radius of the spring is r, the force to operate the control rod is F and the radius of the control rod is R. Furthermore, it is provided that the angle of the spring fitting arm 29 at the operation start position P1 with respect to the line perpendicular to the axis C1 of the return spring 35 is $\beta = (\alpha - 90°)$.

The moment M1 of the tension spring 32 becomes Kt·Et·rt, the moment M2 of the return spring 35 becomes Kr·Er·rcos $(\theta - \beta)$ and the force M0 to operate the clutch lever becomes M1+M2.

Figure 29:
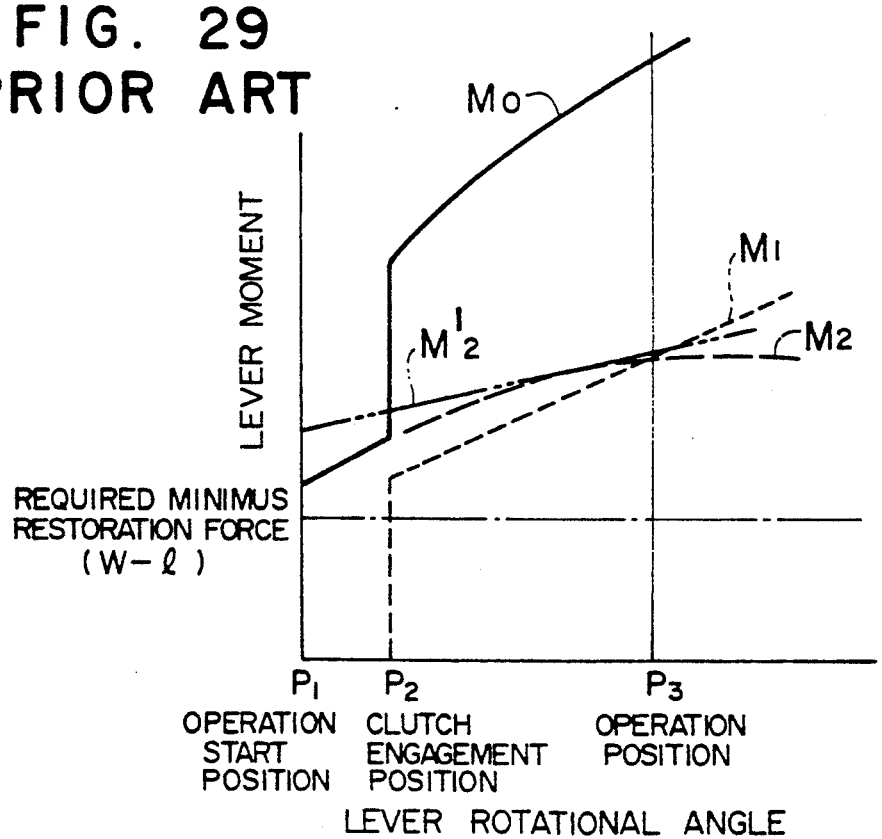
FIG. 29 is a graph which illustrates a change of force necessary to operate the clutch lever shown in FIG. 28.

That is, as shown in graph in FIG. 29, the moment M2 of the return spring 35 is always increased from the operation start position P1 to the operation position P3. Therefore, the force M0 = M1 +M2 to operate the clutch lever is increased at a high rate from clutch engagement position P2 to the operation position. Therefore, large force becomes force necessary to grip the clutch lever at the operation position.

Another problem arises, in addition to the above-described problem in terms of the increase in the operating force, in that a compact body cannot be realized and its appearance is not satisfactory since the return spring 35 is disposed on the outer portion of the edger body as shown in FIG. 28. A related technology has been disclosed in Japanese Patent Laid-Open No. 62-236406.

Figure 21:
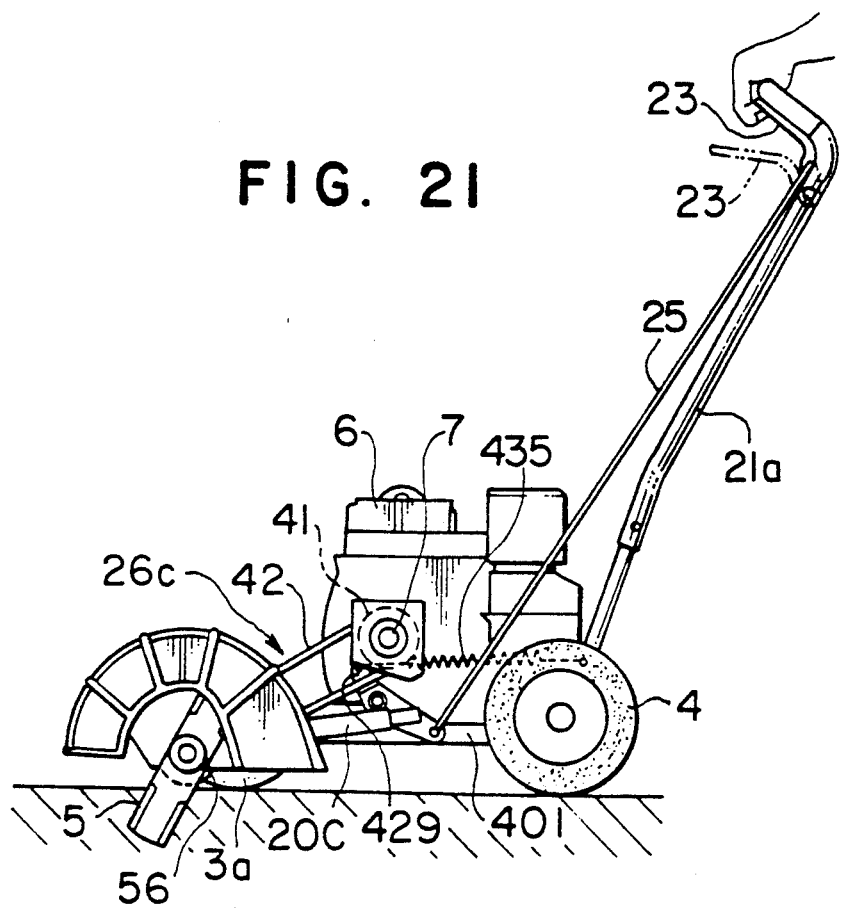
FIG. 21 is a side elevational view which illustrates another embodiment of the edger according to the present invention having an improved return spring fitting structure.

FIG. 21 is an overall side-elevational view which illustrates the edger according to the present invention in which the structure of a return spring 435 an..d a fitting arm 429 are improved in comparison to the conventional structure shown in FIGS. 27 and 28, the other structure remain unchanged. Therefore, the same elements as those shown in FIGS. 27 and 28 are given the same reference numerals and the description of the overall structure is omitted here.

Figure 22:
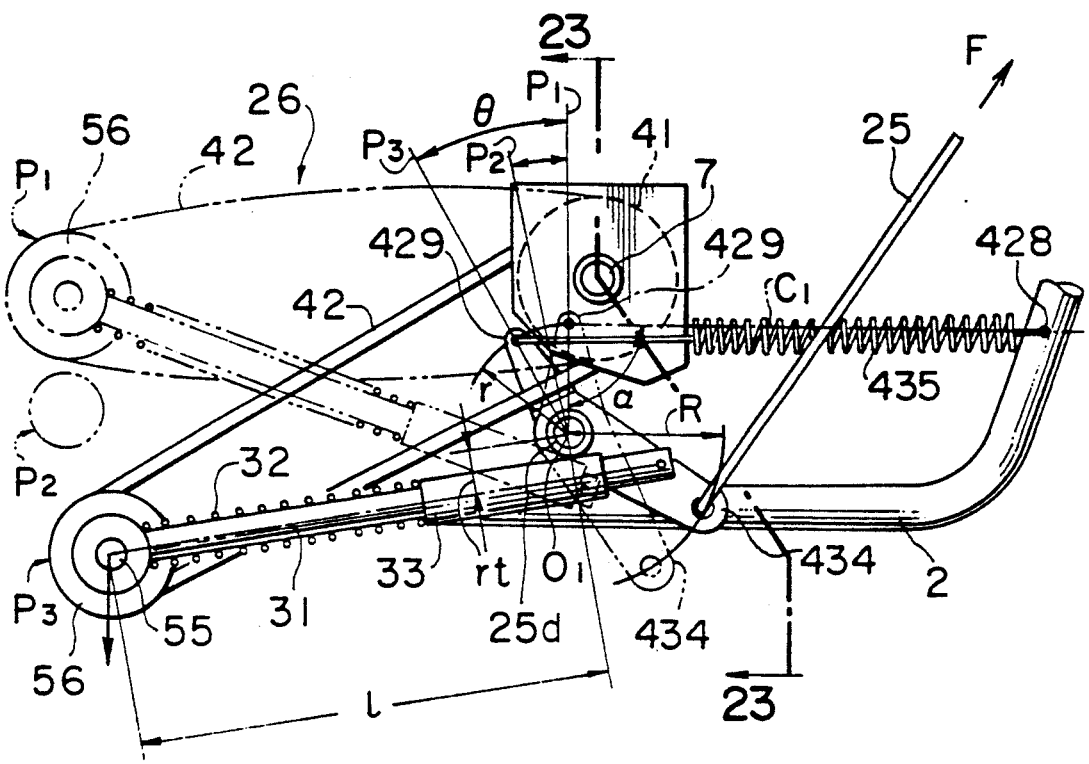
FIG. 22 is an enlarged view which illustrates an essential portion of the return spring fitting structure of the edger shown in FIG. 21.

FIG. 22 is an enlarged view of an essential portion of FIG. 21. Referring to the drawing, the spring fitting arm 429 integrally formed with a control lever 434, extends upwards at the operation start position (at the time of the disengage) P1 as shown by a phantom line. On the other hand, the front end portion of the return spring 435 is secured to the front end portion of the fitting arm 429. The return spring 435 extends rearwards in such a manner that its axis C1 becomes horizontal at the time of the disengagement state. The rear end portion of it is directly secured to the spring securing hole 428 formed in the frame 2. That is, it is arranged in such a manner that the angle $\alpha$ made between the fitting arm 429 and the axis C1 of the return spring 435 at the operation start position P1 becomes 90°. Furthermore, it is arranged in such a manner that the above-described angle $\alpha$ is always decreased in accordance with the rotation toward the operation position P3.

Figure 23:
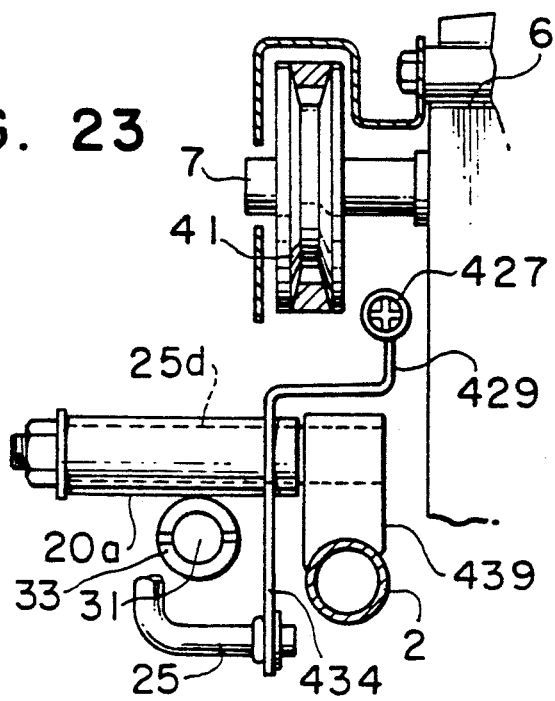
FIG. 23 is an enlarged cross sectional view taken along line 23—23 of FIG. 22.

FIG. 23 is an enlarged cross sectional view taken along line 23—23 of FIG. 22. Referring to the drawing, the fitting arm 429 is bent at the top end portion of the control lever 434 toward the engine 6 and it further extends upwards between the driving pulley 41 and the engine 6. Therefore, the return spring 435, secured to the front end portion of the fitting arm 429, is disposed between the lower end portion of the driving pulley 41 and the engine 6. The rod 25d is supported by a bracket 439 secured to the frame 2C.

The operation will now be described. When the clutch lever 23, shown in FIG. 21, is pulled toward the operator, the pulley 56 to be driven, shown in FIG. 22, is lowered from the upper operation start position (the disengagement position) P1 and simultaneously the fitting arm 429 forwardly extends the return spring 435. When the pulley 56 to be driven reaches the clutch engagement position P2, the engagement of the belt 42 is started and the compression of the tension spring 32 is simultaneously started. The pulley 56 to be driven is further lowered to the operation position P3 so that the preparation for the operation has been completed.

During the extension of the return spring 435, the fitting arm 429 is rotated forwards and the return spring 435 is extended. In accordance with these motions, the angle $\alpha$ from the fitting arm 429 is gradually decreased from 90°, causing the moment of the return spring 435 to be gradually reduced. Therefore, the force necessary to operate the clutch lever can be reduced satisfactorily and the increase ratio of the same can also be reduced.

Figure 24:
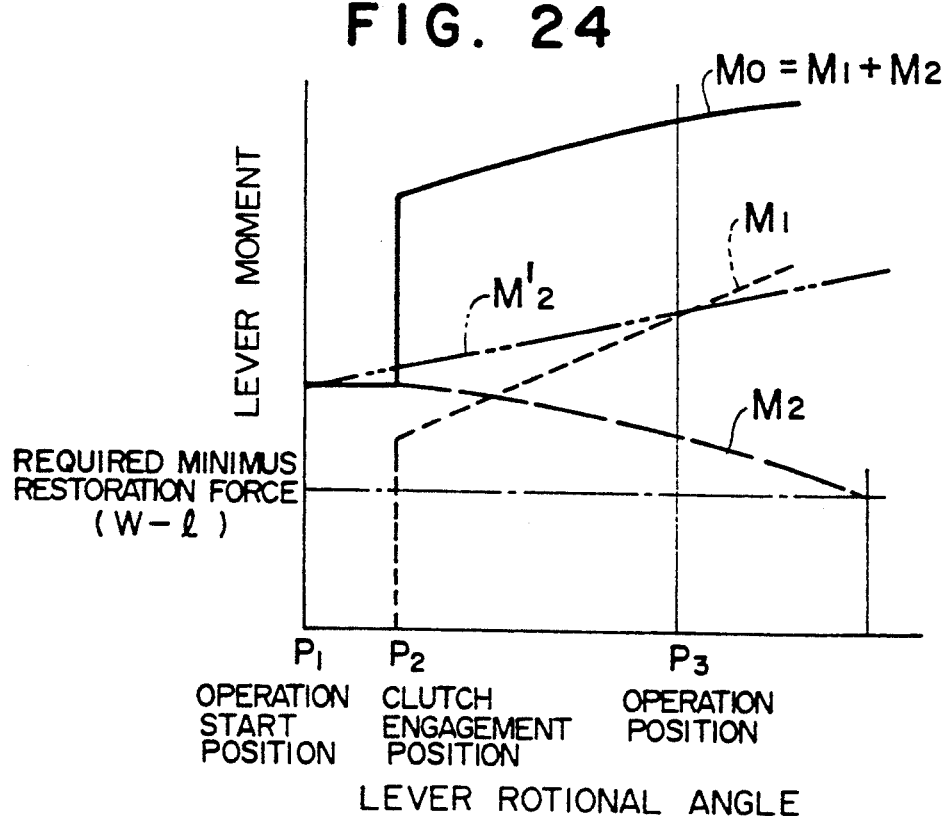
FIG. 24 is a graph which illustrates a change of force necessary to operate the clutch lever shown in FIGS. 21 and 22.

FIG. 24 is a graph which illustrates the clutch lever operating force M0 shown in FIGS. 21 to 23. Assuming that symbol M1 represents the change in the moment of the tension spring 32, M2' represents the change in the moment of the return spring 435, and M2' represents the change in the moment in the case where it is assumed that the fitting radius of the return spring fitting ar shown in FIG. 22 is not changed, the following relationships hold: $M1 = Kt \cdot Et \cdot rt$, $M2 = Kr \cdot Er \cdot r\cos\theta$, $M0 = F \cdot R = M1 + M2 = Kt \cdot Et \cdot rt + Kr \cdot Er \cdot r\cos\theta$, $M2' = Kr \cdot Er \cdot r$. Similarly in the above-described conventional structure, symbol $\theta$ represents the lever operation angle, W represents the weight of cutter head, l represents the position of the center of gravity of the cutter head, Kt represents the spring constant of the tension spring 32, Et represents its displacement, Rt represents the fitting radius of the spring, Kr represents the spring constant of the return spring 435, Er represents its displacement, R represents the fitting radius of the spring, F represents the force to operate the control rod and R represents the radius of the control rod.

In comparison to the graph shown in FIG. 29, referring to the graph shown in FIG. 24, the return spring moment M2 is not substantially changed from the operation start position P1 to the clutch engagement position P2, and it is always decreased from the clutch engagement position P2 to the operation position P3. Therefore, the increase in the clutch lever operating force M0 is prevented at the clutch engagement position P2 and a further increase of the same is also prevented. Therefore, it is apparent that the power necessary to grip the clutch lever at the operation position P3 can be maintained at a low level.

Figure 25:
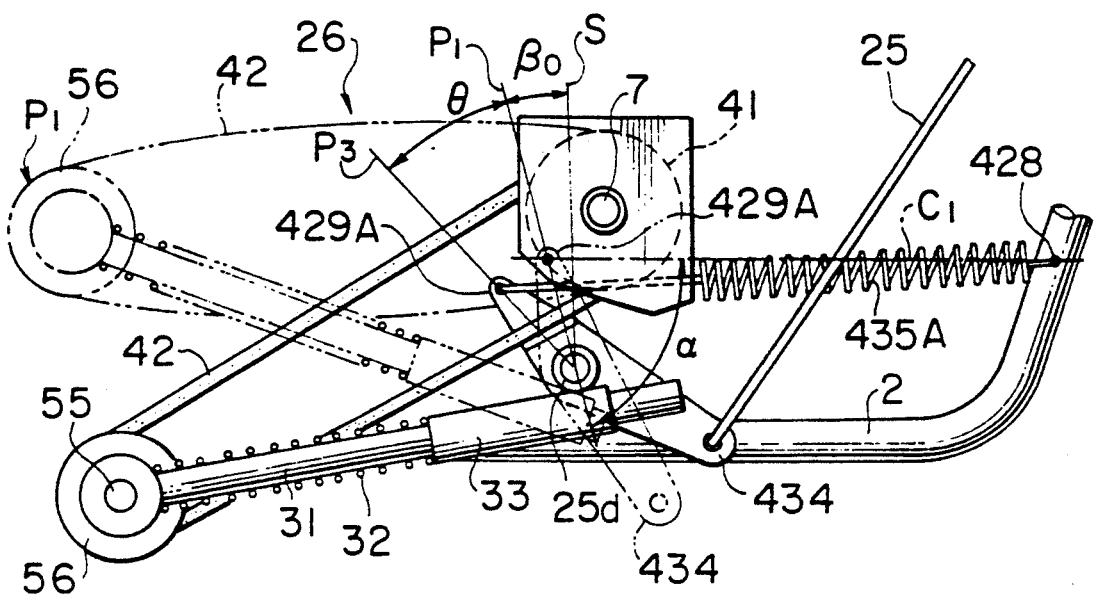
FIG. 25 is an enlarged side elevational view which illustrates an essential portion of another embodiment of the present invention.

FIG. 25 illustrates an example in which the angle $\alpha$, formed between the axis of the return spring 435A and the spring fitting arm 429A at the operation start position (at the time of disengagement) P1, is arranged to be smaller than 90°. That is, the return spring 435 is disposed longitudinally so as to have its axis disposed horizontally at the operation start position P1 and the fitting arm 429A is arranged in such a manner that its fitting angle $\beta 0 = 90° - \alpha$ with respect to the perpendicular S passing through the supporting shaft 25d.

Figure 26:
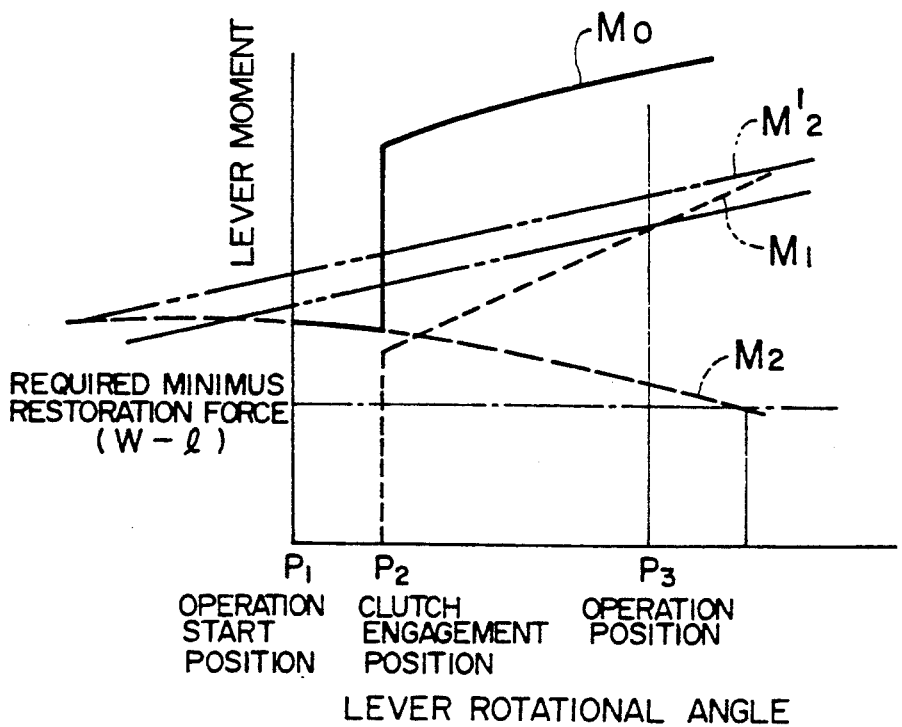
FIG. 26 is a graph which illustrates a change of force necessary to operate the clutch lever according to the embodiment shown in FIG. 25.

FIG. 26 illustrates a change in the clutch lever operating force M0 shown in FIG. 25. Referring to the graph, the return spring moment M2 at the operation start position P1 is further restricted and it is always decreased from the operation start position P1 to the operation position P3. Therefore, the clutch lever operating force M0 and the grasping power necessary to grip the clutch lever at the operation position P3 can be further reduced. Referring to FIG. 26, the following relationships hold:

$$M1 = Kt \cdot Et \cdot rt, \ M2 = Kr \cdot Er \cdot r\cos(\theta + \beta 0),$$

$$M0 = F \cdot R = M1 + M2 = Kt \cdot Et \cdot rt + Kr \cdot Er \cdot r\cos(\theta + \beta 0),$$
$$M2' = Kr \cdot Er \cdot r.$$

A modification arranged such that the return spring is fastened below the driving pulley may be employed.

Structure for fitting the rotary blade cover

Then, an improvement in the structure for fitting the rotary blade cove for the edger will be described with reference to FIGS. 30 to 33.

Also according to an edger disclosed in Japanese Patent Laid-Open No. 62-236406, a portion of the rotary blade is covered with a cover. The rotary blade cover of this type can be manufactured from resin since forming can be conducted easily and its weight is satisfactorily small.

Figure 32:
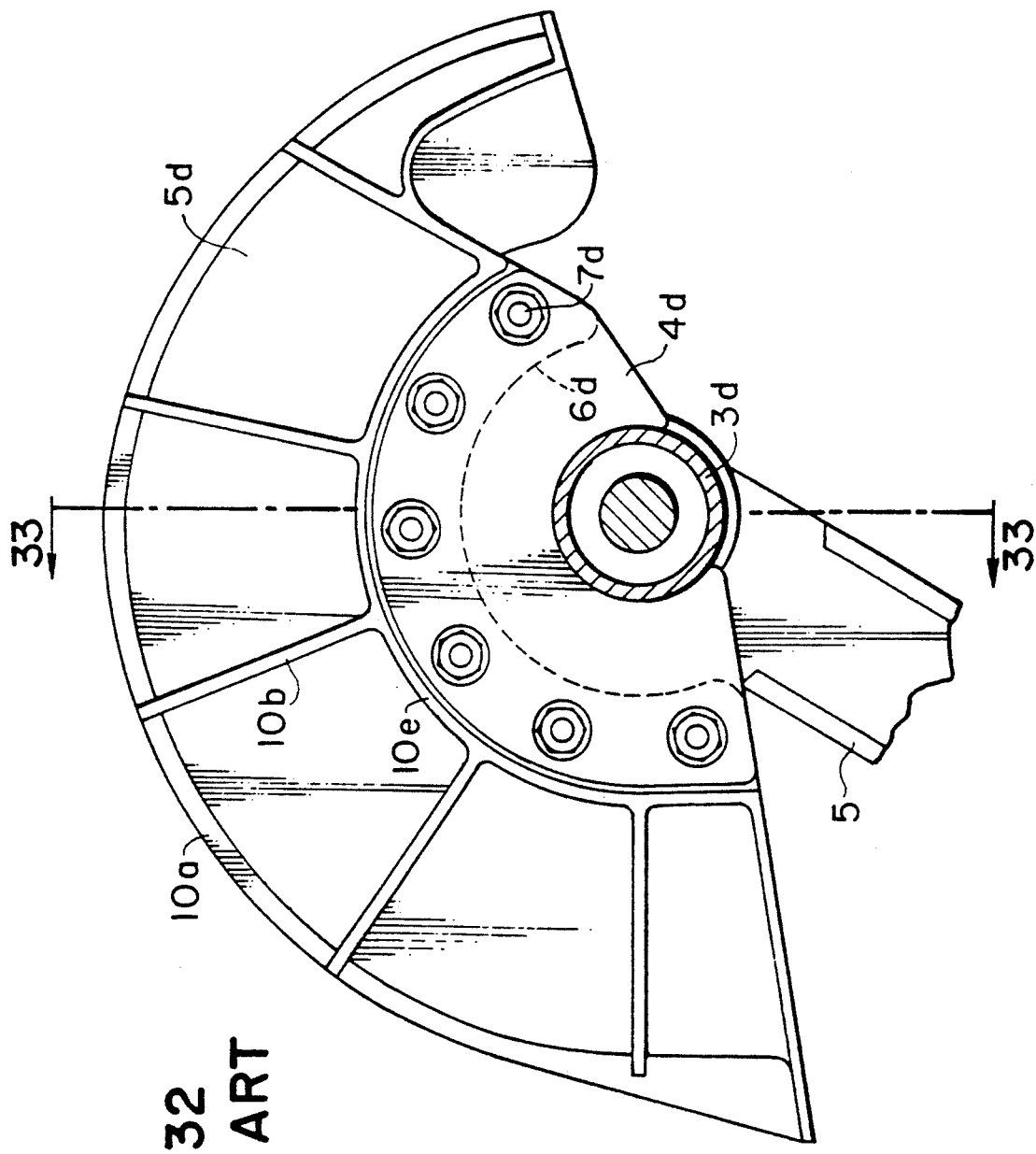
FIG. 32 is a side elevational view which illustrates a conventional blade cover.

In order to fasten the resin cover for the rotary-blade blade to the bearing housing, a structure shown in FIGS. 32 and 33 has been widely used. That is, the inside portion of a rotary-blade cover 5d is positioned to overlap a metal flange 4d which is integrally formed with a bearing housing 3d by welding or the like and a metal plate 6d having the same outer diameter as that of the flange 4d is further placed to overlap the flange. The thus layered component are fixed by a bolt/nut 7d in the direction of their thickness. The metal plate 6d is provided for the purpose of dispersing the clamping force of the bolt/nut 7d in the resin cover 5d. The metal plate 6d can be replaced by a metal collar (omitted from iilustration) fastened to a hole 10h formed in the cover 5d into which the bolt is inserted. Reference numeral 5 represents a rotary blade and 55 represents its supporting shaft (the axis of rotation).

Since the rigidity of the fastened cover 5d is proportional to the contact area (strictly, the contact area and the radius to the contact portion) of the flange 4d with respect to the cover 5d, the outer diameter of the flange 4d with respect to the cover 5d, the outer diameter of the order to also improve the rigidity of the cover 5d, reinforcing ribs 10a, 10b and 10e, as shown in FIG. 32 may be formed on the surface of the cover 5d. The rib 10a is formed on the outer circumferential edge, the ribs 10b are formed outward from the inner portion, and the rib 10e is formed at the boundary from the outer end portion of the flange 4d. The thus formed ribs 10a, 10b and 10e enable the rigidity of the cover 5d to be improved without enlarging its weight.

The fitting structure shown in FIGS. 32 and 33 raises the following problems:

(a) The enlargement of the outer diameter of the flange 4d for the purpose of improving the fitting rigidity of the rotary-blade cover 5d increases the weight of the overall body of the edger and raises the manufacturing cost.

(b) Since the cover 5d is held between the flange 4d and the metal plate 6d which have the same outer diameter, the portion at which the stress is concentrated, that is, the contact line portion between the cover 5d and each of the outer circumferences of the flange 4d and the metal plate 6d overlap on the inner and the outer surfaces of the cover 5d. Since the contact line portion is the boundary between a portion supported by the flange 4d, which is equal to a complete rigid body and a free portion, the level of the stress concentrated to the above-described portion becomes a considerably large value. Since the cover 5d is frequently applied with force due to the external force or vibrations, the above-described stress concentration influences the durability (the life) of the cover 5d.

(c) In the case where collars are employed as an alternative to the metal plate 6d, stress also concentrates in the external end portion of the flange 4d on the surface of the cover 5d and the portion at which the collar is fastened. Furthermore, it takes time to fasten the multiplicity of collars, causing the overall cost to arise.

Figure 30:
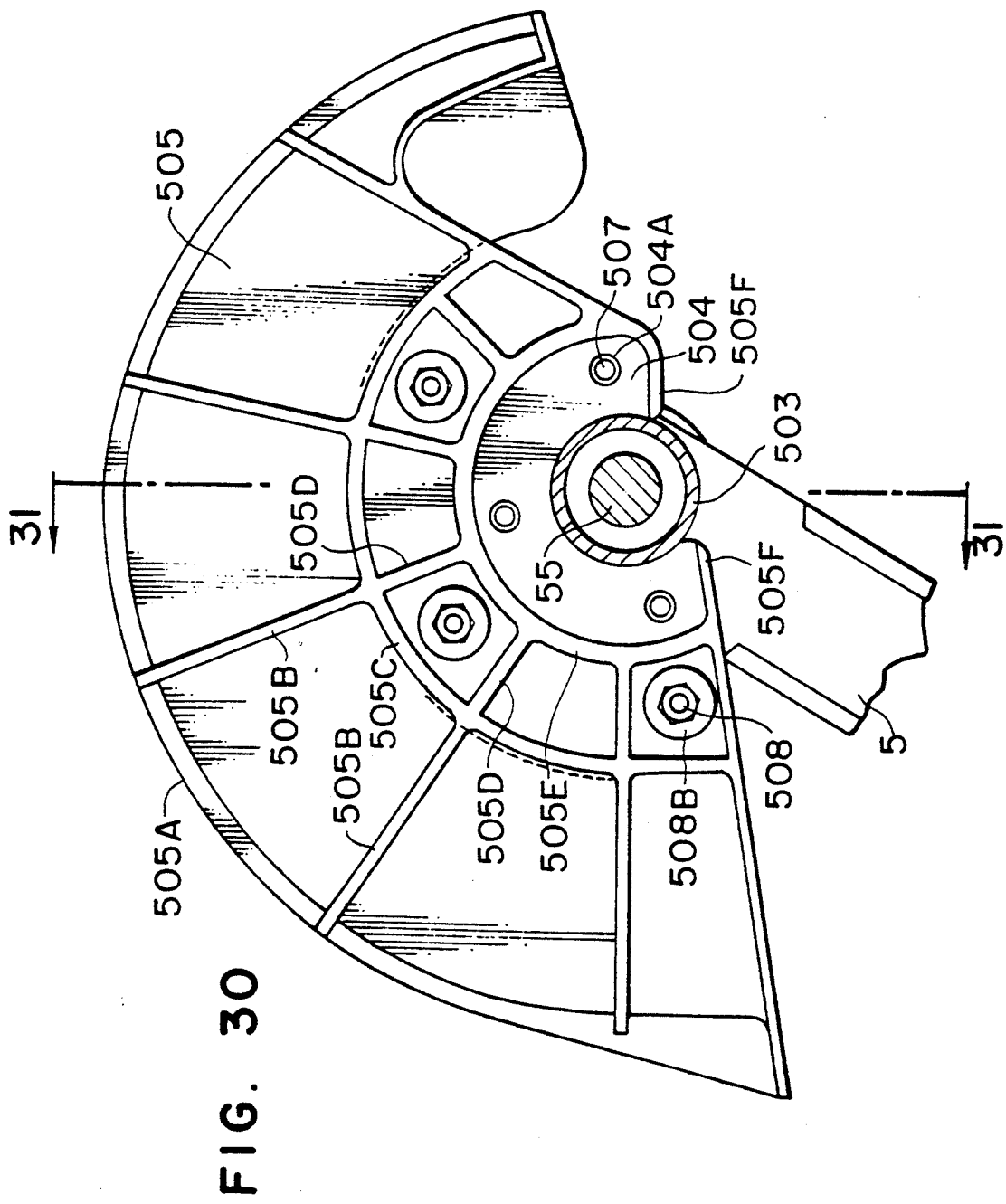
FIG. 30 is a side elevational view which illustrates an improved rotational blade cover of the edger according to the present invention.

FIGS. 30 and 31 illustrate an embodiment of the present invention. Referring to FIGS. 30 and 31, the rotary blade 5 is fastened to the front end portion of a supporting shaft 55 operated by the engine via a power transmission mechanism (omitted from illustration) so that it is rotated with the supporting shaft 55.

Referring to the drawings, reference numeral 27 represents a bearing for the supporting shaft 55, 503 represents a bearing housing therefor, 501A represents a housing cap, 501B represents a seat plate and 501C represents a nut. The rotary blade 5 is fastened to the supporting shaft 55 by the cap 501A, the seat plate 501B and the nut 501C.

Since the portion in which the rotary blade 5 cuts the lawn at its lower portion close to the ground, its upper half portion is covered with a cover 505. The cover 505 is made of a resin whose weight is reduced and which can be easily formed, the cover 505 being fastened onto a flange 504 in the inner portion thereof (the portion adjacent to the supporting shaft 55). The flange 504 is made of metal and is integrally formed with the above-described bearing housing 503 by welding.

According to this embodiment, the cover 505 is fastened to the flange 504 in such a manner that:

(a) The dimension of the flange 504 is designed to be of a small size, that is, the outer diameter thereof is reduced such that a certain space can be created on both the outside and the inside of three threaded holes 504A arranged in the circumferential direction.

(b) A thin plate 506 made of metal which can be easily elastically deformed and having a large deformation range is designed to have an outer diameter larger than that of the flange 504 and the same inner diameter as that of the cover 505.

(c) The thus designed thin plate 506, bolts 507, spring seats 507A, bolts 508, spring washers 508A, plain washers 508B and nuts 508C are used as shown in FIG. 31. That is, the inner portion of the cover 505 is fastened between the inner portion of the thin plate 506 and the flange 504 by the bolt 507 (and the thread hole 504A). The portion outward of the flange 504 is fastened to the outer peripheral portion of the thin plate 506 by the bolts 508 and the nuts 508C.

As shown in FIG. 30, reinforcing ribs 505A, 505B, 505C, 505D, 505E and 505F are formed on the surface of the cover 505. Although the ribs 505A, 505B and 505E are positioned at the conventional positions (the ribs 10a, 10b and 10e shown in FIG. 32), ribs 505C, 505D and 505E are disposed to surround the portion into which the bolt 508 inserts and the rib 505F surrounds the end portion of the flange 504. Each of the above-described ribs 505A, 505B, 505C, 505D, 505E and 505F improve the rigidity of the cover 505 at the corresponding portions. Therefore, portions of the cover in the vicinity of the bolts 508 can be prevented from deflecting by the ribs 505C, 505D and 505E, causing the degree of integration with the thin plate 506 to be improved. Furthermore, the degree of integration with the flange 504 is improved by the rib 505F. In particular, since the rib 505C is formed at the position of the same radius as the outer periphery of the thin plate 506, it is effective to relax the stress which can be easily raised in the above-described portion. The reason for the provision of the plain washer 508B having a relatively large diameter lies in that the above-described degree of integration between the cover 505 and the thin plate 506 is intended to be improved.

As a result, although the cover 505 is directly fastened to the flange 504 on the inner portion thereof, the other portions including the outer portion is fastened to the thin plate 506 which is joined to the flange 504. Therefore, the cover 505 is integrally supported by the flange 504. As a result, sufficient rigidity can be realized in the cover 5 in its fastened state and the stress can be widely dispersed to the fastening portion with the thin plate 506 even if an external force acts on the cover 505. Furthermore, since the outer diameter of the flange 504 is reduced and the thickness of the thin plate 506 is small, the weight of the above-described fastening portions can be reduced.

The above-described embodiment may be arranged as follows:

As an alternative to the above-described structure arranged such that the cover 505 is fastened to the flange 504 at a position adjacent to the rotary blade 5, a structure may be employed in which the cover 505 and the thin plate 506 overlays each other and are fastened to the position (the left side of the flange 504 shown in FIG. 31) opposite to the above-described position.

Another structure may be employed in which a member corresponding to the flange 504 is not provided but a flange surface acting similarly is formed at the end surface of the bearing housing 503.

As an alternative to the reinforcing ribs 505C, 505D and 505E, the thickness of a portion in the vicinity of the portion into which the bolt 508 is inserted may be enlarged so as to improve the degree of integration with the thin plate 506. According to this embodiment, since the thickness is increased in only the portion outside the flange 504 to the outer end portion of the thin plate 506, the weight increase of the cover 505 can be satisfactorily prevented.

The present invention can be applied to not only edgers or mowers but also to a variety of machines using the rotary blade. That is, the present invention can be widely employed as a structure for fastening a rotary-blade cover for a wood or metal cutter or a grinder.

Clutch and brake device for a belt driving device—A)

An improvement in a clutch and brake device for a belt driving device according to the present invention will now be described with reference to FIGS. 34 to 42.

Figure 36:
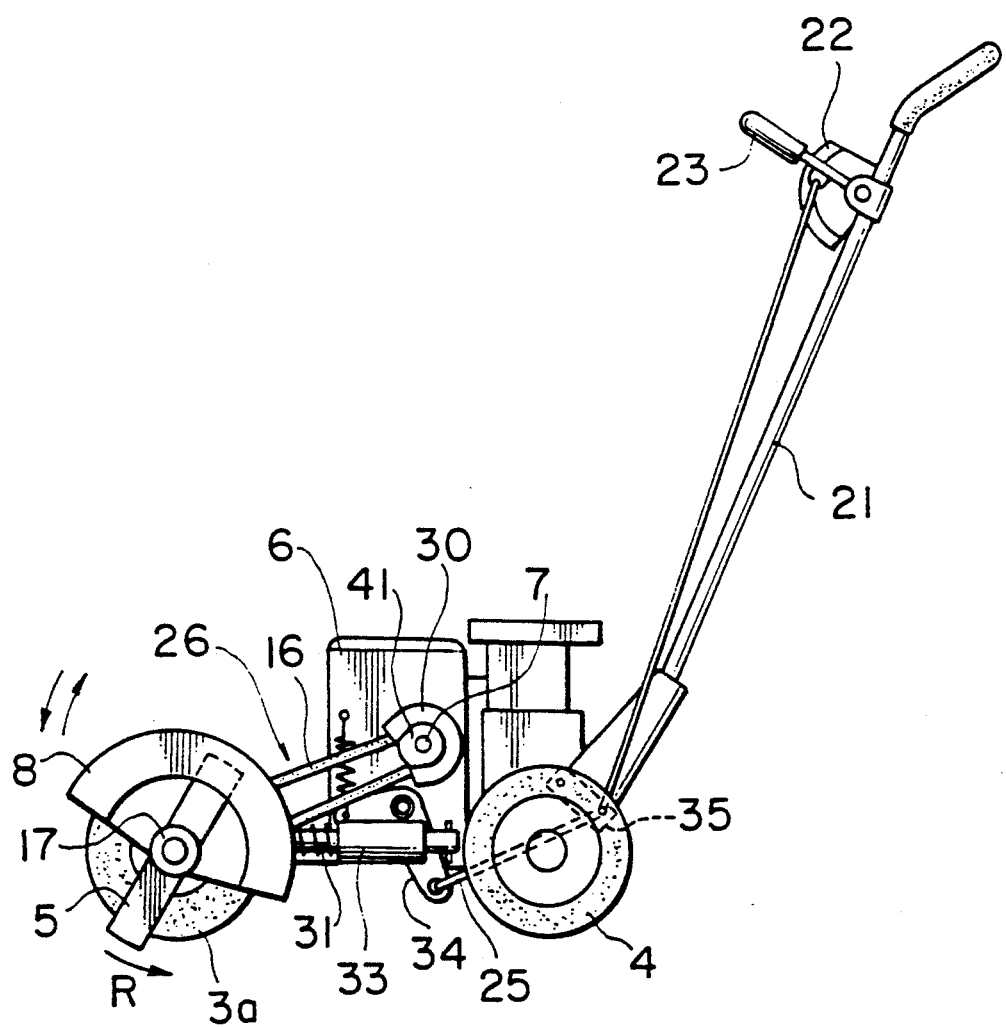
FIG. 36 is a side elevational view which illustrates an edger having a conventional belt driving device.
Figure 37:
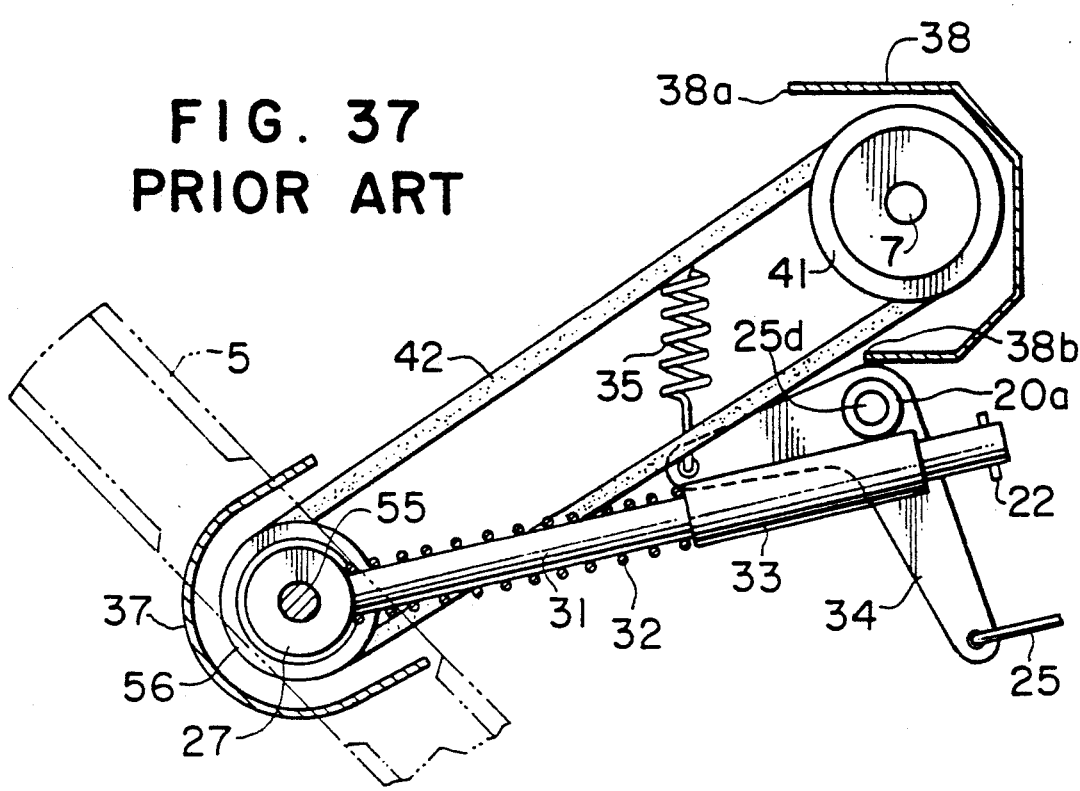
Figure 38:
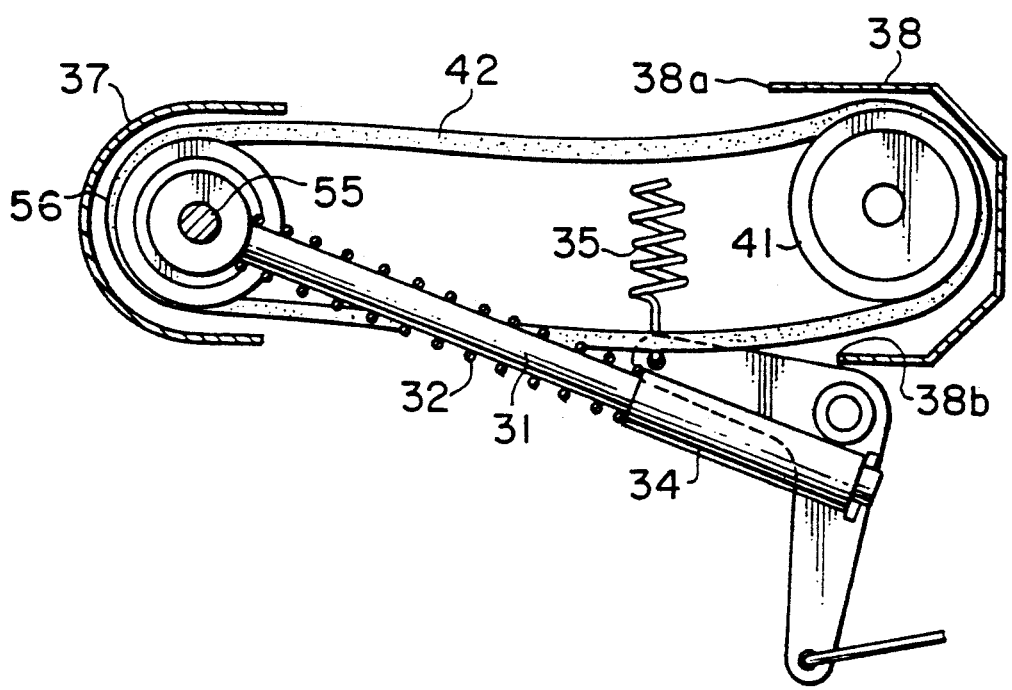
FIG. 38 is a side elevational view which illustrates a state in which the clutch of the belt driving device shown in FIG. 37 is released.

FIG. 36 illustrates an example of an edger having the belt driving device of the type described above. FIGS. 37 and 38 illustrate a conventional belt driving device employed by the above-described type edger or the like. Referring to these drawings, the structure of the edger and the basic structure of the belt driving device will now be described.

Referring to FIG. 36, the engine 6 is mounted on the edger body having two rear wheels 4 and one front wheel 3a.. The longitudinal cutter 5 is disposed, for example, in the front portion on the left side of the edger body, the cutter 5 being connected to the drive shaft (the engine output shaft) 7 via the belt driving device 26.

Referring to FIG. 37, which illustrates the conventional belt driving device, the pulley 56 to be driven is disposed in the lower portion of the front portion of the driving pulley 41 secured to the drive shaft 7. The pulley 56 to be driven is secured to an end portion of a horizontally-disposed shaft 55 to be driven, the shaft 55 to be driven being rotatably supported by the bearing 27. The cutter 5 is secured to the other end portion of the shaft 55 to be driven.

The rod 31 extending rearwards is secured to the bearing 27, the rod 31 being inserted into the cylindrical swing arm 33 in such a manner that it can slide in the longitudinal direction. The rod 31 is urged by the urging spring 32 disposed and compressed between the bearing 27 and the swing arm 33 in the direction in which the distance between the two pulleys 41 and 56 is enlarged. The stopper pin 22 is secured to the rear end portion of the rod 31.

The swing arm 33 is supported in such a manner that it can swing vertically centering the supporting shaft 25d disposed below the drive shaft 7,.the swing arm 33 being further connected, via the embossed portion 20a or the like, to the control lever (bell-crank) 34 of an L-shape in such a manner that it can integrally swing.

The return spring 35 for upwards urging of the control lever 34 is secured to the front end portion of the control lever 34, the return spring 35 having an upper end portion which is secured to, for example, the bracket or the like of the engine 6 (see FIG. 36). The control rod 25 is secured to the lower end portion of the control lever 34, the control rod 25 being connected to the clutch lever 23 of the operation handle 21 as shown in FIG. 36.

When the clutch lever 23 shown in FIG. 36 is raised and it is thereby engaged in the groove of the securing plate 22 or the like, the control rod 25 is pulled rearwards and the swing arm 33 is thereby rotated downwards. As a result, the distance between the two pulleys 41 and 56 is enlarged, causing the clutch to be engaged. On the other hand, when the clutch lever 23 shown in FIG. 36 is returned forwards, the swing arm 34 is, as shown in FIG. 38, rotated upward by the return spring 35 and simultaneously the distance between the two pulleys 41 and 56 is reduced, causing the driving belt 42 to loosen. As a result, the clutch is released.

Hitherto, a belt pulley cover having the shape as shown in FIG. 37 has been employed in the belt driving device of the type described above. That is, a pulley belt cover arranged as follows has been employed: the distance between the pulley cover 37 for the driven-side and the pulley 56 to be driven is selected to be large and the distance between the end portion of the belt outlet portions 38a and 38b of the drive-side pulley cover 38 and the backside of the belt is selected to be large. According to the above-described conventional structure, the driving pulley 41 and the driving belt 42 are brought into contact with each other as shown in FIG. 38 at the time the clutch is released, causing the driving belt 42 to be moved together with the driving pulley 41. What is worse, it takes an excessively long time for the pulley 56 to be driven to be stopped.

When the conventional belt driving device of the type described above is desired to be quickly stopped at the time of the release of the clutch, an individual braking member must be provided and it must be capable of moving in synchronization with the clutching operation, causing the cost to be raised. As the prior art, a structure disclosed in Japanese Patent Laid-Open No. 63-28322 has been known.

Figure 34:
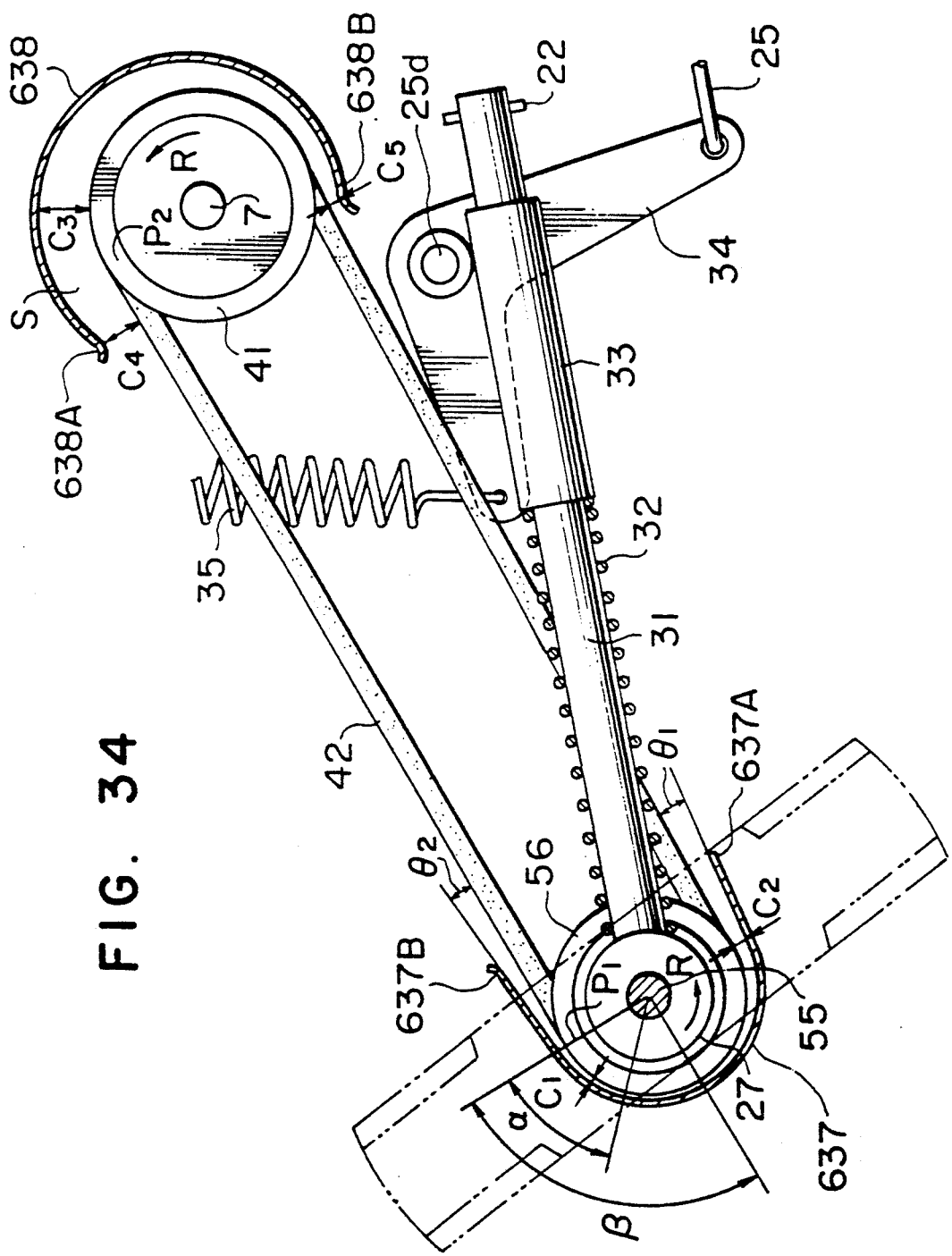
Figure 35:
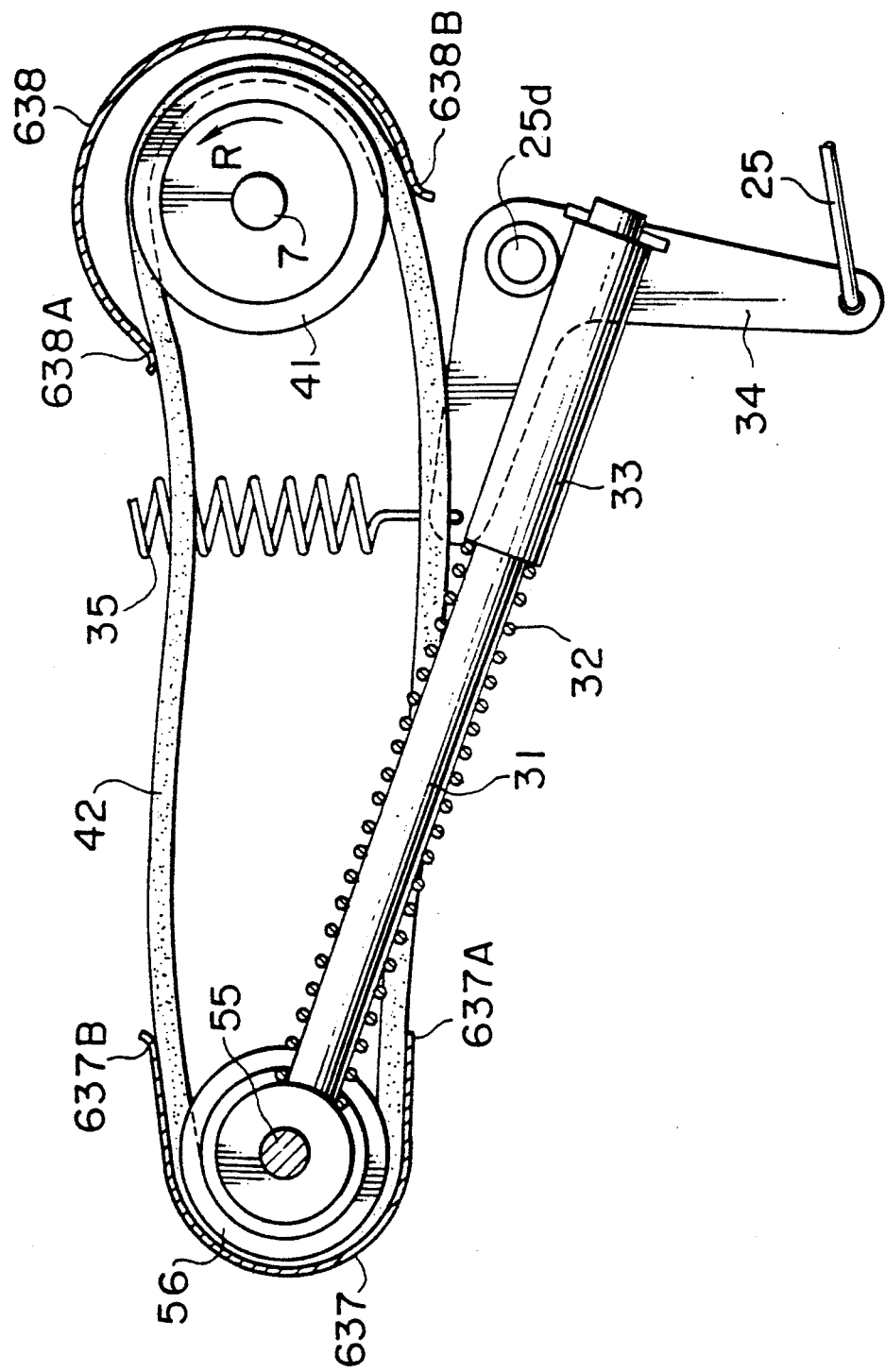
FIG. 35 is a side elevational view which illustrates a state in which the clutch and brake device shown in FIG. 34 is released.

FIGS. 34 and 35 illustrate the belt driving drive according to the present invention and employed in an edger as shown in FIG. 36. However, since the overall structure of the edger has been previously described, it is omitted here. Also the basic structure of the belt driving device has been described when the description about the prior art was made with reference to FIGS. 36 to 38. Therefore, the description of common elements is omitted and the same elements as those shown in FIGS. 36 and 37 are given the same reference numerals.

Referring to FIG. 34, the belt pulley cover is divided into two sections: a driving-side pulley cover 638 disposed in the rear portion and a driven-side pulley cover 637 disposed in the front portion. Each of the pulley covers 638 and 637 is made by sheeting. The driving-side pulley cover 638 is secured to the engine 6, while the driven-side pulley cover 637 is secured to the driven-side pulley bearing 27.

The driven-side pulley cover 637 comprises a substantially semicircular front portion covering the outer periphery of the front portion of the driven-pulley 56 and substantially straight extension portions formed at the two end portions of the belt inlet portion and the belt outlet portion. The angles $\theta 1$ and $\theta 2$ made between each of the straight extension portions at the outlet and the inlet portions and the driving belt 42 is arranged to be 0° or more. The distance between the driven-side pulley cover 637 and the pulley 56 to be driven is arranged to be a small value such that the driving belt 42 and the pulley 56 to be driven can be brought into contact with each other at the time of the clutch release. In particular, it is arranged that distance C1 from the back side of the belt is the minimum value, for example, 5 mm or less in which the angle $\beta$ ranges from about 90° from the belt introduction starting point P1 at the belt inlet portion in the rotational direction R in which the range of angle $\alpha$ exceeds about 45°. Furthermore, distance C2 between the portion of the residual driven-side pulley cover 637 and the backside of the belt is arranged to be larger than the above-described minimum value.

The driving side pulley cover 638 is arranged to be a substantially partial circle whose angle of circumference is larger than 180° so as to cover the outer portion of the driving pulley 638. The driving side pulley cover 638 is reduced in end portions 638A and 638B thereof adjacent to the belt inlet and outlet portions for the purpose of releasing the driving pulley 41 and the driving belt 42 at the time of the clutch release. It will be now be described in detail. The end portions 638A and 638B of the driving side pulley cover 638 adjacent to the belt inlet and outlet portions are respectively disposed in the vicinity of the backside of the belt on the tangent line to the belt. Distance C5 between the end portion 638B adjacent to the belt inlet portion and the driving belt 42 is arranged to be a small value. Distance C3 between the driving pulley 41 and the driving side pulley cover 638 is arranged to be larger than the distance C5 between the driving belt 42 and the end portion 638B adjacent to the belt inlet portion. Furthermore, the distance C3 is arranged to be gradually widened in accordance with the direction R of rotation from the belt inlet portion, the distance C3 being arranged to be the maximum value in front of belt release point P2 adjacent to the belt outlet portion so that a belt holding space S is formed. However, the end portion 638A adjacent to the belt outlet portion is, as described above, reduced in shape, distance C4 between the end portion 638A and the driving belt 42 is arranged to be smaller at least than the distance C3 at the belt holding space S.

The operation will now be described. When the control rod 25 is loosened from the clutch engaged state shown in FIG. 34, the swing arm 33 is raised due to the urging force of the return spring 35. As a result, the distance between the two shafts of the two pulleys 41 and 56 is, as shown in FIG. 35, reduced, causing the driving belt 42 to be loosen. Since the driving belt 42 is also raised at this time, the backside of the belt 42 is brought into contact with the end portion 638A of the driving side pulley cover 638 adjacent to the belt outlet portion, causing the belt 42 to be braked. Furthermore, the driving belt 42 is expanded outwards in the radial direction in the driving side pulley cover 638, in particular, in the holding space S due to contact with the above-described end portion 638A, causing the belt 42 to be released from the driving pulley 41. The belt 42 is also brought into contact with the end portion 638B adjacent to the belt inlet portion.

That is, the driving belt 42 is released from the driving pulley 41, causing the movement of the driving belt together with the driving pulley 41 to be prevented.

On the other hand, although the driven-side pulley cover 637 is raised together with the bearing 27, the driving belt 42 acts to return to its manufactured shape that is, to a circular shape, causing the driving belt 42 to be brought into contact with the end portion 637B adjacent to the belt inlet portion and the end portion 637A adjacent to the belt outlet portion. As a result, the belt 42 is brought into contact with the pulley 56 to be driven in the above-described minimum interval C1.

That is, simultaneously with the braking of the driving belt 42 by the contact between the pulley 56 to be driven and the end portions 637B and 637A, the pulley 56 to be driven is braked by the contact between the driving belt 42 and the pulley 56 to be driven. As a result, the rotation of the cutter 5 is quickly stopped.

Clutch and brake device for a belt driving device—(B)

Hitherto, in the belt driving device of the type described above, the driven-side pulley cover 37 covers the pulley 56 to be driven and prevents the separation of the driving belt 42 at the time of the clutch release. Therefore, when the clutch is released, the driving belt is released at the driving pulley side and the driving belt 42 is simultaneously radially released from the pulley groove 57 of the pulley 56 to be driven at the driven-side pulley portion as designated by a continuous line of FIG. 42.

As described above, since the pulley 56 to be driven and secured to the same shaft 55 to be driven as the cutter 5 or the like is released, the user must wait for the rotation of the cutter 5 due to inertia force or the like although the user releases the clutch mechanism. Therefore, it takes an excessively long time for the cutter 5 to be stopped.

If the rotation of the cutter is desired to be quickly stopped by releasing the clutch, independent brake means must be provided and the brake means must be arranged to act in synchronization with the clutch operation, causing the cost to be raised. A related structure has been disclosed in Japanese Patent Laid-Open No. 63-28322.

Figure 39:
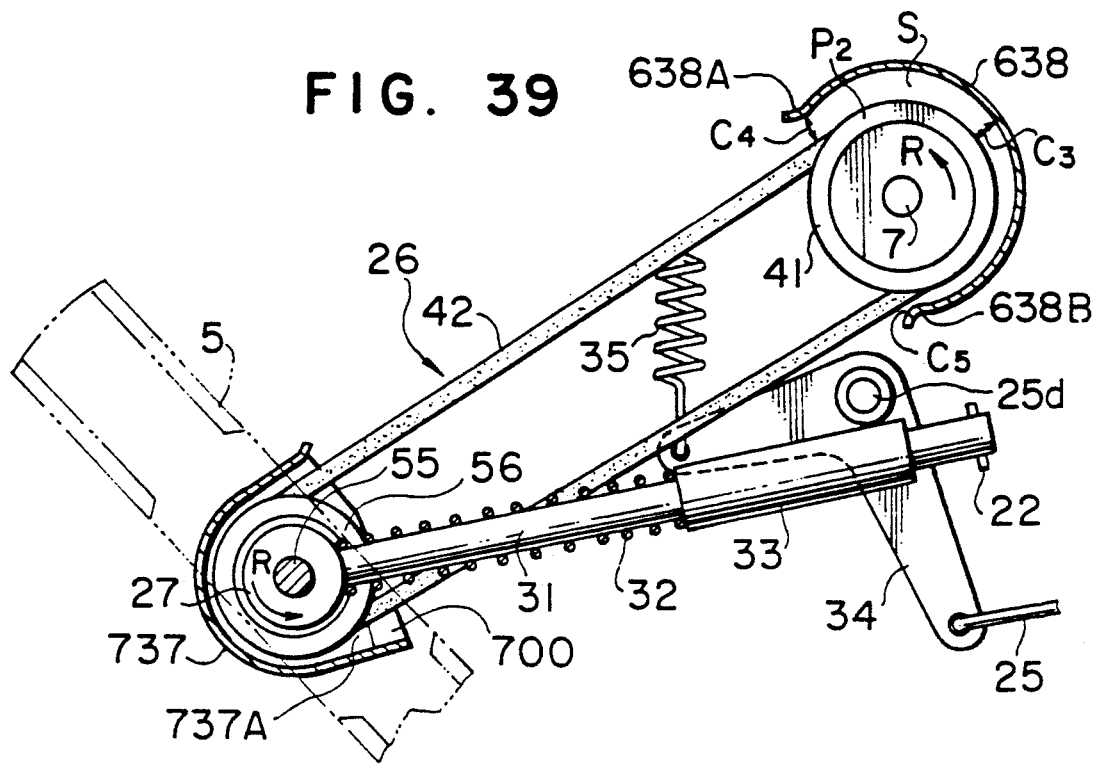
Figure 40:
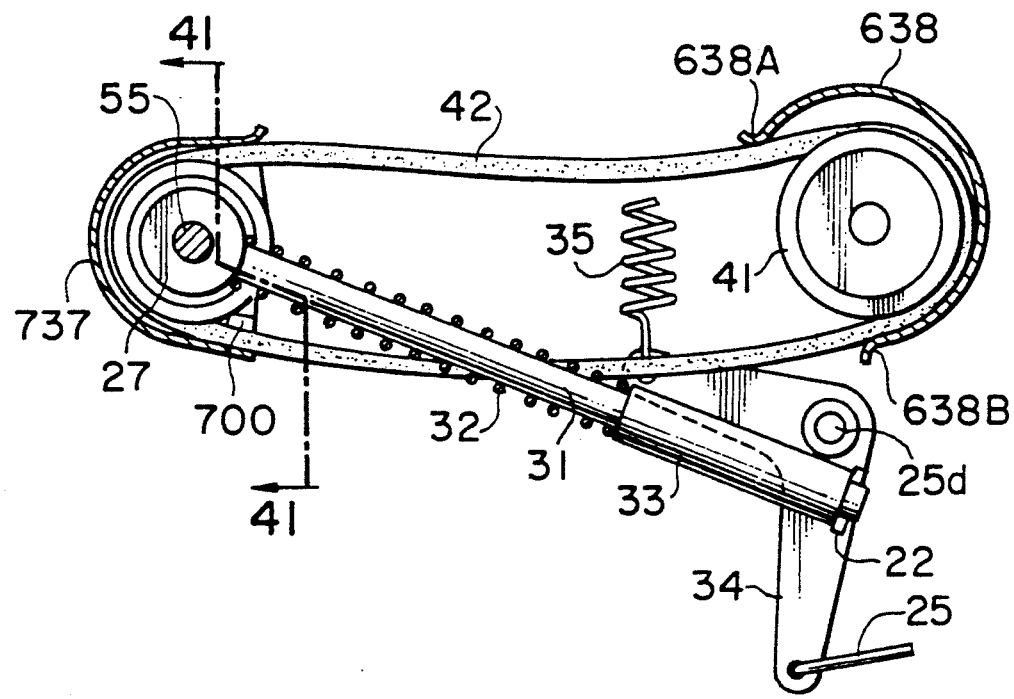
FIG. 40 is a side elevational view which illustrates a state in which the clutch of the belt driving device shown in FIG. 39 is released.
Figure 41:
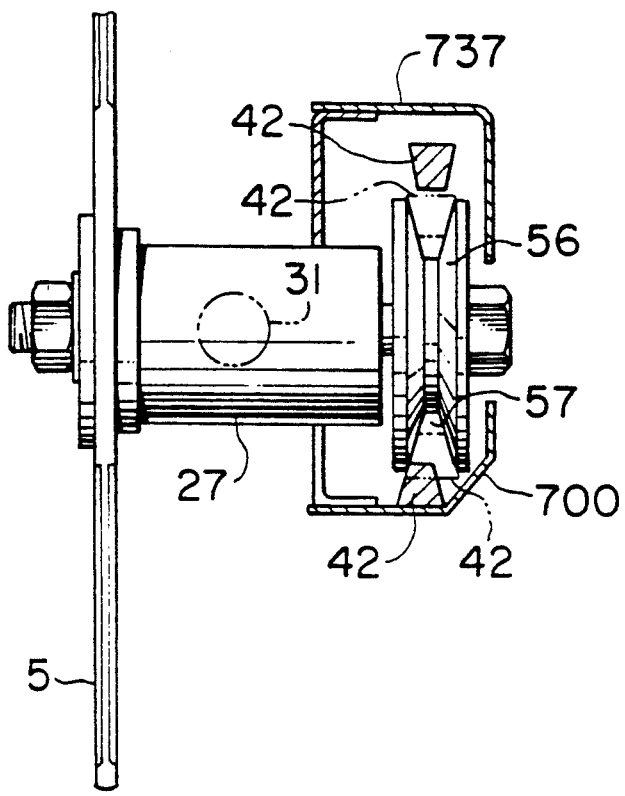
FIG. 41 is an enlarged cross sectional view taken along line 41—41 of FIG. 40.
Figure 42:
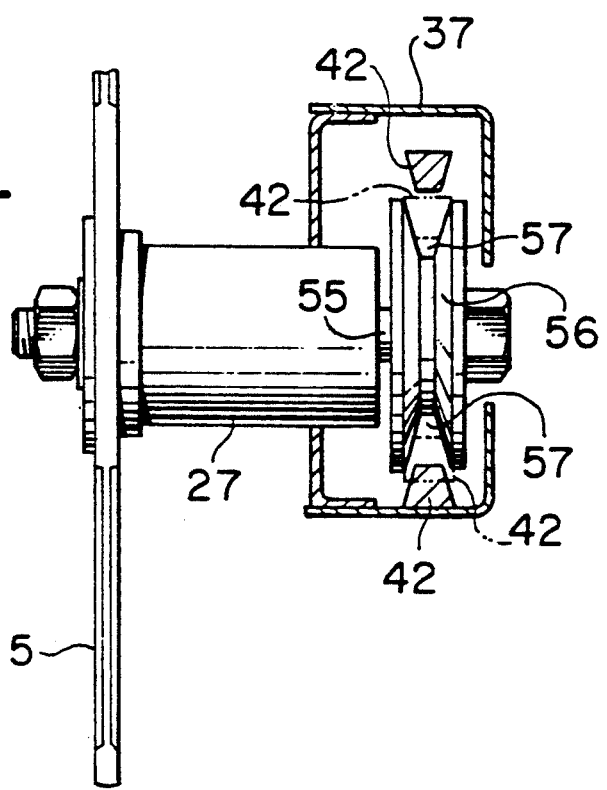
FIG. 42 is a cross sectional view which illustrates a conventional belt driving device.

According to an embodiment of the present invention shown in FIGS. 39 to 41, a driven-side pulley cover 737 comprises a substantially semicircular front portion covering the outer periphery of the front portion of the pulley 56 to be driven and substantially straight extension portions formed at the two end portions of the belt inlet portion and the belt outlet portion. A slant portion 700 for pressing, by its sliding motion, the driving belt 42 to the side surface of the pulley groove 57 as shown in FIG. 41 is formed at a belt outlet portion 737A of the driven-side pulley cover 737. The slant portion 700 is arranged to incline toward the bearing 27 in accordance with the distance in the radial direction toward the outer periphery.

The operation will now be described. As shown in FIG. 36, when the clutch lever 23 is raised toward the user so as to have it engaged with the groove formed in the securing plate 22, the control rod 25 is, as shown in FIG. 39, pulled rearwards and the swing arm 33 is thereby lowered. As a result, the distance between the shafts between the two pulleys is enlarged, Causing the clutch to be engaged.

When the clutch lever 21 shown in FIG. 36 is inclined forwards from the clutch engaged state shown in FIG. 39 and the control rod 25 is thereby loosened, the swing arm 33 is, as shown in FIG. 40, raised due to the elastic force of the return spring 35. As a result, the distance between the two shafts of the two pulleys is shortened, causing the driving belt 42 to be loosened as described above. The backside of the belt 42 is brought into contact with the end portion 638A of the driving-side pulley cover 638 adjacent to the belt outlet portion and the belt 42 is thereby braked. Furthermore, the driving belt 42 is outwardly expanded in the radial direction so that the driving belt 42 is released from the driving pulley 41.

That is, the driving belt 42 is released from the driving pulley 41 and the movement of the driving belt together with the driving pulley 41 is prevented.

As for the driven-side pulley cover 737, since the driving belt 42 is loosened and acts to return to its manufactured shaped that is, to a circular shape, the driving belt 42 is brought into contact with the slant portion 700 at the belt outlet portion 737A as shown in FIG. 41. As a result, the driving belt 42 is slid and pressed to the side surface of the pulley groove 57. That is, since the driving belt 42 is brought into contact with the slant surface 700 of the driven-side pulley cover 737 and the side surface of the pulley groove 57, the driving belt 42 and the pulley 56 to be driven are braked, causing the rotation of the cutter 5 to be stopped quickly.

The slant portion may be formed at the belt inlet portion of the driven-side pulley cover. Alternatively, it may be formed at both the belt inlet and the outlet portions.

Although the invention has been described in its preferred form with a certain degree of particularly, it is understood that the present disclosure of the preferred form may be changed in the details of construction and a different combination and arrangement of parts may be resorted to without departing from the spirit and the scope of the invention as hereinafter claimed.

What is claimed is:

1. An edger having a main frame, at least one front wheel fastened in the front portion of said main frame, two rear wheels fastened in the rear portion of said main frame, a rotary blade disposed in the front portion on either side of said main frame and capable of conducting edging, an engine mounted on said main frame and a driving device for operating said rotary blade with said engine, wherein said rotary blade is fastened to a rotary-blade supporting shaft rotatably disposed in a bearing housing formed in said main frame and a resin cover for covering a portion of said rotary blade is fastened to a flange of generally circular configuration formed on said bearing housing of said rotary-blade supporting shaft, said edger comprising a structure for fitting said rotary blade cover arranged such that:

the inner portion of said cover is held between said flange and a thin metal plate having an outer diameter larger than that of said flange and said cover, flange and thin metal plate are fastened together; and said thin metal plate and said cover are fixed by fastening means at a positioning outside said flange.

2. An edger according to claim 1 wherein a reinforcing rib surrounding a portion into which said fastening means inserted is formed in a portion of said cover at a position at which said thin metal plate does not come into contact and outside said flange.

3. An edger according to claim 2 wherein said fastening means is a bolt.

4. An edger according to claim 1 wherein said fastening means is a bolt.

* * * * *